United States Patent [19]
Fukino et al.

[11] Patent Number: 5,337,187
[45] Date of Patent: Aug. 9, 1994

[54] ZOOM LENS SYSTEM

[75] Inventors: Kunihiro Fukino, Fujisawa; Toru Takayama, Kawasaki; Kiyotaka Inadome, Kawasaki; Masahiro Nakatsuji, Kawasaki, all of Japan

[73] Assignee: Nikon Corporation, Tokyo, Japan

[21] Appl. No.: 112,052

[22] Filed: Aug. 26, 1993

Related U.S. Application Data

[63] Continuation of Ser. No. 977,207, Nov. 16, 1992, abandoned.

[30] Foreign Application Priority Data

Nov. 20, 1991 [JP] Japan .................. 3-304887

[51] Int. Cl.⁵ .............................. G02B 15/14
[52] U.S. Cl. ....................... 359/699; 359/695; 359/687; 354/195.12
[58] Field of Search ............ 359/687, 686, 688, 694, 359/695, 699, 700, 698; 354/195.12, 195.13

[56] References Cited

U.S. PATENT DOCUMENTS

| | | | |
|---|---|---|---|
| 4,627,691 | 12/1986 | Tomori | 359/700 |
| 4,763,999 | 8/1988 | Lawther | 359/699 |
| 4,848,884 | 7/1989 | Enomoto | 359/700 |
| 4,925,282 | 5/1990 | Kanno et al. | 359/698 |
| 4,993,815 | 2/1991 | Yamazaki | 359/699 |
| 5,000,551 | 3/1991 | Shibayama | 359/687 |
| 5,032,013 | 7/1991 | Shibayama | 359/687 |

FOREIGN PATENT DOCUMENTS 63-163808 7/1988 Japan .
64-35515 2/1989 Japan .
64-35516 2/1989 Japan .

*Primary Examiner*—Loha Ben
*Attorney, Agent, or Firm*—Shapiro and Shapiro

[57] ABSTRACT

In a zoom lens system having a plurality of lens units including a focusing lens unit movable during zooming and having the zooming and focusing functions, when a predetermined movement locus for zooming is expressed with the angle of rotation of a rotatable lens barrel for prescribing the amount of movement of the lens units in the direction of the optical axis thereof as a variable, the movement locus of the focusing lens unit is formed by the combination of a focus cam and a zoom compensation cam, and the movement locus of the movable non-focusing lens units which are not concerned in focusing is formed by the combination of the zoom compensation cam and a zoom cam corresponding to each non-focusing lens unit.

4 Claims, 13 Drawing Sheets

FIG. 2

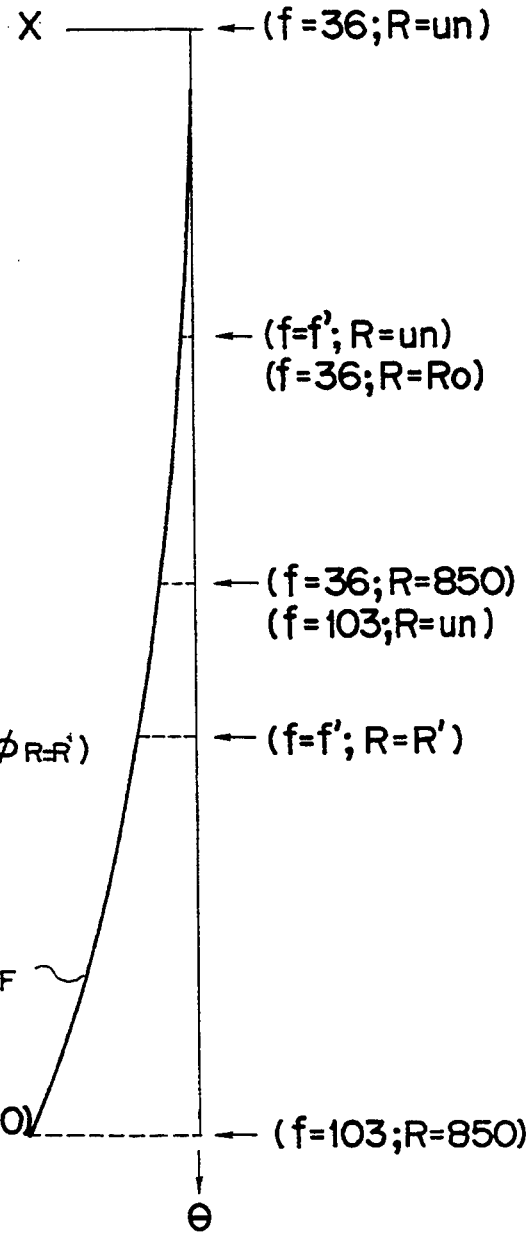

$(X;\Theta)=(0;0)$ — $(f=36; R=un)$ $(X;\Theta)=(X_{f=f', R=un}; \Theta_{f=f'})$
$= (\Delta X_{f=36, R=Ro}; O_{f=f'})$
— $(f=f'; R=un)$
$(f=36; R=Ro)$ $(X;\Theta)=(\Delta X_{f=36, R=850}; 55)$
$=(X_{f=103, R=un}; 55)$
$=(1.0365; 55)$
— $(f=36; R=850)$
$(f=103; R=un)$ $(X;\Theta)=(X_{f=f', R=un}+\Delta X_{f=f', R=R'}; \Theta_{f=f'}+\phi_{R=R'})$
— $(f=f'; R=R')$ $g_F$ $(X;\Theta)=(\Delta X_{f=36, R=850}+\Delta X_{f=103, R=850}; 110)$
$=(5.1165; 110)$
— $(f=103; R=850)$ NOTE: $X_{f=103, R=un} = \Delta X_{f=36, R=850}$ $\Delta X_{f=f', R=R'}$: AMOUNT OF LENS MOVEMENT AT $f=f'$ AND $R=R'$

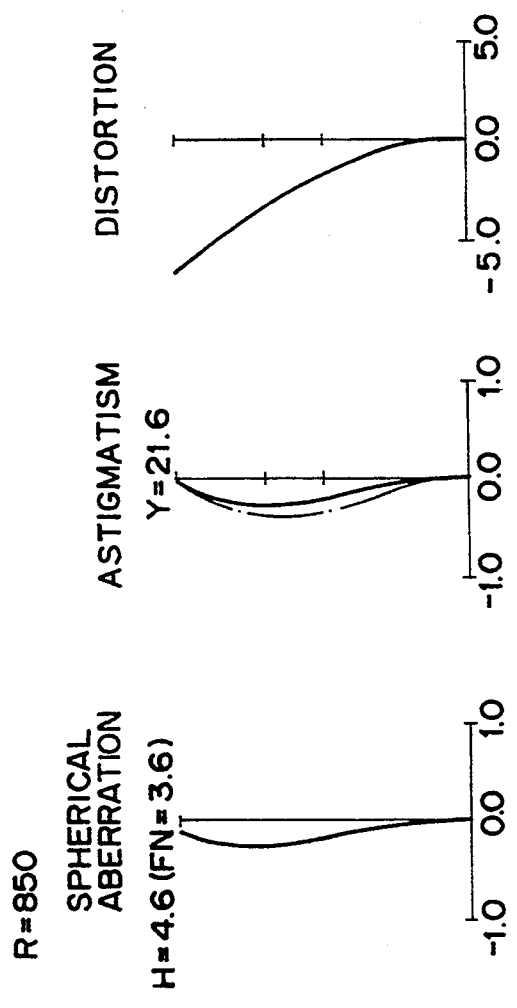
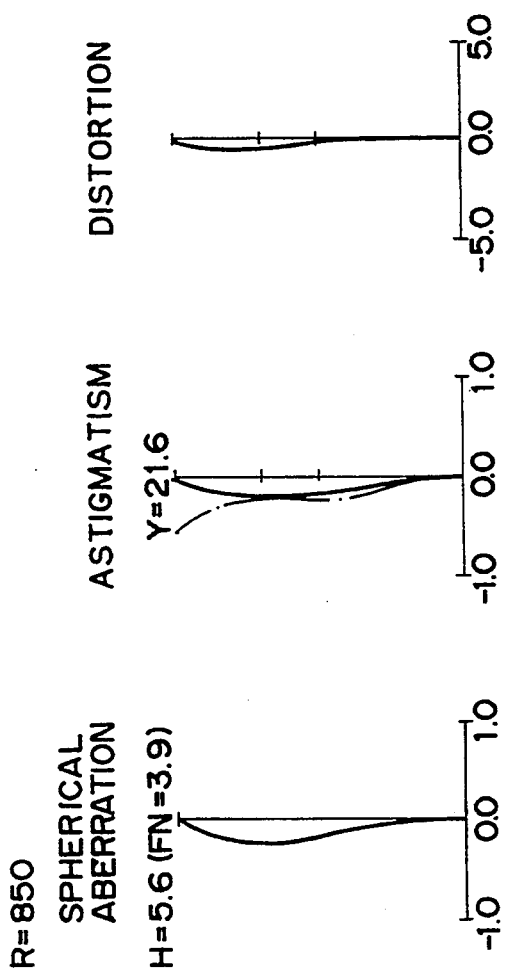
FIG. 10

ZOOM LENS SYSTEM

This is a continuation of application Ser. No. 977,207 filed Nov. 16, 1992, now abandoned.

BACKGROUND OF THE INVENTION

1. Field of the Invention

This invention relates to a zoom lens barrel, and particularly to a focusing system therefor, and more particularly to a so-called inner focusing or rear focusing system in which focusing is effected by the movement of a lens unit other than the front lens unit on the object side.

2. Related Background Art

In recent years, there have been proposed various other focusing systems than the front focusing system to achieve the compactness, high performance and further, high zoom ratio of zoom lenses.

Generally, however, where the other focusing systems than the front focusing system are adopted, the amount of axial movement varies with a variation in focal length, and this has led to the disadvantage that so-called manual focusing becomes impossible. Also in the front focusing system, zoom lenses of which the total length varies with focal length pose a similar problem that the amount of axial movement for focusing varies.

So, Japanese Laid-Open Patent Application No. 63-163808 has proposed a method of utilizing the locus of a focusing lens unit moving during zooming to thereby make so-called manual focusing possible even if the amount of axial movement necessary for focusing differs depending on the state of zooming. That is, this method is such that when a predetermined movement locus for zooming is expressed with the angle of rotation of a rotatable lens barrel for prescribing the amount of movement of each lens unit in the direction of the optical axis thereof as a variable, all movement loci are set so that the amount of rotative movement for the focusing of the focusing lens unit on the movement locus for zooming may become equal to a predetermined object distance in any zoomed state.

The above-described method is a method of high realizability which enables the manual focusing when the amount of axial movement differs which has heretofore been regarded as impossible to be accomplished. However, when this method is generally applied to an actual optical system, the angle of rotation required for focusing becomes considerably small as compared with the angle of rotation required for zooming.

Also, in the structure of hardware, it is desirable that a plurality of cams corresponding to the movement locus of any movable lens unit be formed with the eccentricity and operability of the lens taken into account. Thus, the magnitude of the angle of rotation required for zooming is subjected to a predetermined limitation. Accordingly, where the angle of rotation required for focusing is considerably small as compared with the angle of rotation required for zooming, the angle of rotation for focusing in terms of the structure of hardware necessarily becomes considerably small.

In this case, when the angle of rotation for the focusing of the focusing lens unit and the angle of rotation of a distance ring coincide with each other, that is, when a rotating mechanism concerned in the focusing of the focusing lens unit and the distance ring are directly connected together, there arises the problem that the photographing distance to which the focusing lens unit is to be focused suddenly varies when the distance ring is rotated for focusing and thus, focusing becomes difficult.

Thus, in reality, because of the necessity of securing a great angle of rotation of the distance ring, there arises the necessity of enlarging the angle of rotation for the focusing of the focusing lens unit and transmitting it to the distance ring. However, a helicoid mechanism cannot be used when the angle of rotation is enlarged and therefore, it is necessary to newly provide a cam mechanism or a differential mechanism for enlargement. This gives rise to the factor of back-lash in terms of the structure of hardware and results in a reduction in focusing accuracy and the aggravation of operability.

Further, from the characteristic that focusing is accomplished by the focusing lens unit being moved on the locus along which it is moved during zooming, there is the disadvantage that the position of the imaging point varies, though in the depth of field, for any focal length and any photographing distance. Accordingly, by the addition of the enlarging mechanism, the amount of displacement of the position of the imaging point has been enlarged and has sometimes exceeded the depth of focus.

Also, from the characteristic that focusing is accomplished by the focusing lens unit being moved on the locus along which it is moved during zooming, there has been the problem that focusing becomes impossible when the movement locus is fixed relative to the image plane or in case of so-called U-turn locus. These have been problems also common to Japanese Laid-Open Patent Application No. 64-35515, and Japanese Laid-Open Patent Application No. 64-35516.

From the above-noted points, it has been difficult to provide a zoom lens which is high in focusing accuracy and excellent in operability, and to realize such a zoom lens, an increase in cost has been unavoidable from the necessity of enhancing the accuracy of hardware.

SUMMARY OF THE INVENTION

It is therefore the object of the present invention to secure the angle of rotation of a rotatable lens barrel for the focusing movement of a focusing lens unit sufficiently great and transmit it directly to the amount of rotation of a distance ring without interposing any special enlarging mechanism in the structure of the lens barrel, irrespective of the movement locus of the focusing lens unit and yet converting the movement locus of each lens unit so as to suppress the amount of displacement of the imaging point by focusing to a sufficiently small value at the same time, thereby providing a zoom lens which is high in focusing accuracy as well as simple in the structure of hardware and excellent in operability.

According to the present invention, in a zoom lens system having a plurality of lens units including a focusing lens unit movable during zooming and having the zooming and focusing functions, the movement locus of the focusing lens unit is formed by a combination of a focus cam and a zoom compensation cam and at the same time, the movement locus of movable non-focusing lens units which are not concerned in focusing is formed by the combination of the zoom compensation cam and a zoom cam corresponding to each non-focusing lens units. Further, the amount of rotative movement of a distance ring for the focusing of the focusing lens unit is designed to be equal to the angle of rotation of the rotatable lens barrel prescribed by the focus cam.

Specifically, when the movement loci of the plurality of lens units moved on the optical axis for zooming are expressed with the angle of rotation of the rotatable lens unit for prescribing the amount of movement of each lens unit in the optical axis as a variable, the movement locus of the focusing lens unit during zooming is divided into a movement locus for focusing and a movement locus for zooming compensation to secure the amount of rotative movement of the focusing lens unit for focusing on the rotatable lens unit in such a magnitude that can be utilized as the angle of rotation of the distance ring. Actually, the shape of the movement locus for focusing is determined so that when focusing is effected by the use of this movement locus for focusing, the amount of displacement of the imaging point may be sufficiently small at any focal length and any photographing distance. Subsequently, the movement locus for zooming compensation is determined according to the movement locus for focusing, and finally, with regard to the movable non-focusing lens unit, the movement locus for zooming corresponding to each non-focusing lens unit is determined so that the combination thereof with the movement locus for zooming compensation may be the movement locus of each non-focusing lens unit during zooming To execute the above-described method and make the amount of displacement of the imaging point sufficiently small, it is preferable to make all the divided movement loci non-linear.

In practical use, the movement locus for focusing, the movement locus for zooming compensation and the movement locus for zooming correspond to the focus cam, the zoom compensation cam and the zoom cam, respectively, formed on the rotatable lens barrel rotated about the optical axis of the lens system, the movement locus of the focusing lens unit is formed as the combined movement form by the rotations of the focus cam and the zoom compensation cam and at the same time, the movement locus of the movable non-focusing lens unit is formed as the combined movement formed by the rotations of the zoom compensation cam and the zoom cam.

As described above, the movement locus of the focusing lens unit is formed as the combination of the focus cam and the zoom compensation cam and therefore, if the focusing lens unit is fixed during zooming but is moved during focusing, there is no advantage in the structure of hardware. Conversely, in optical design, fixing the focusing lens unit during zooming not only reduces the degree of freedom in aberration correction, but nips the possibility of downsizing of the lens system in the bud and therefore, it is desirable that the focusing lens unit be positively moved during zooming as well.

According to such structure of the present invention, the angle of rotation of the focusing lens unit for focusing on the rotatable lens barrel is transmitted directly to the distance ring in a sufficiently greatly secured state without the use of any other enlarging mechanism and therefore, the back-lash factor by the enlarging mechanism and the error factor in optical arrangement can be eliminated.

Moreover, the angle of rotation of the distance ring can be secured sufficiently greatly and therefore, the operability during manual focusing can be enhanced. Further, the divided focus cam has its shape determined so that the amount of displacement of imaging point may be sufficiently small and therefore, it is possible to improve focusing accuracy markedly.

BRIEF DESCRIPTION OF THE DRAWINGS

FIG. 2 is an illustration for determining the focus cam of a focusing lens unit.

FIG. 10 shows various aberrations in Embodiment 1 when the focal length f=36, 50 mm and the photographing distance is 0.85 m.

DESCRIPTION OF THE PREFERRED EMBODIMENTS

The present invention will hereinafter be specifically described with respect to some embodiments thereof.

Figure 1:
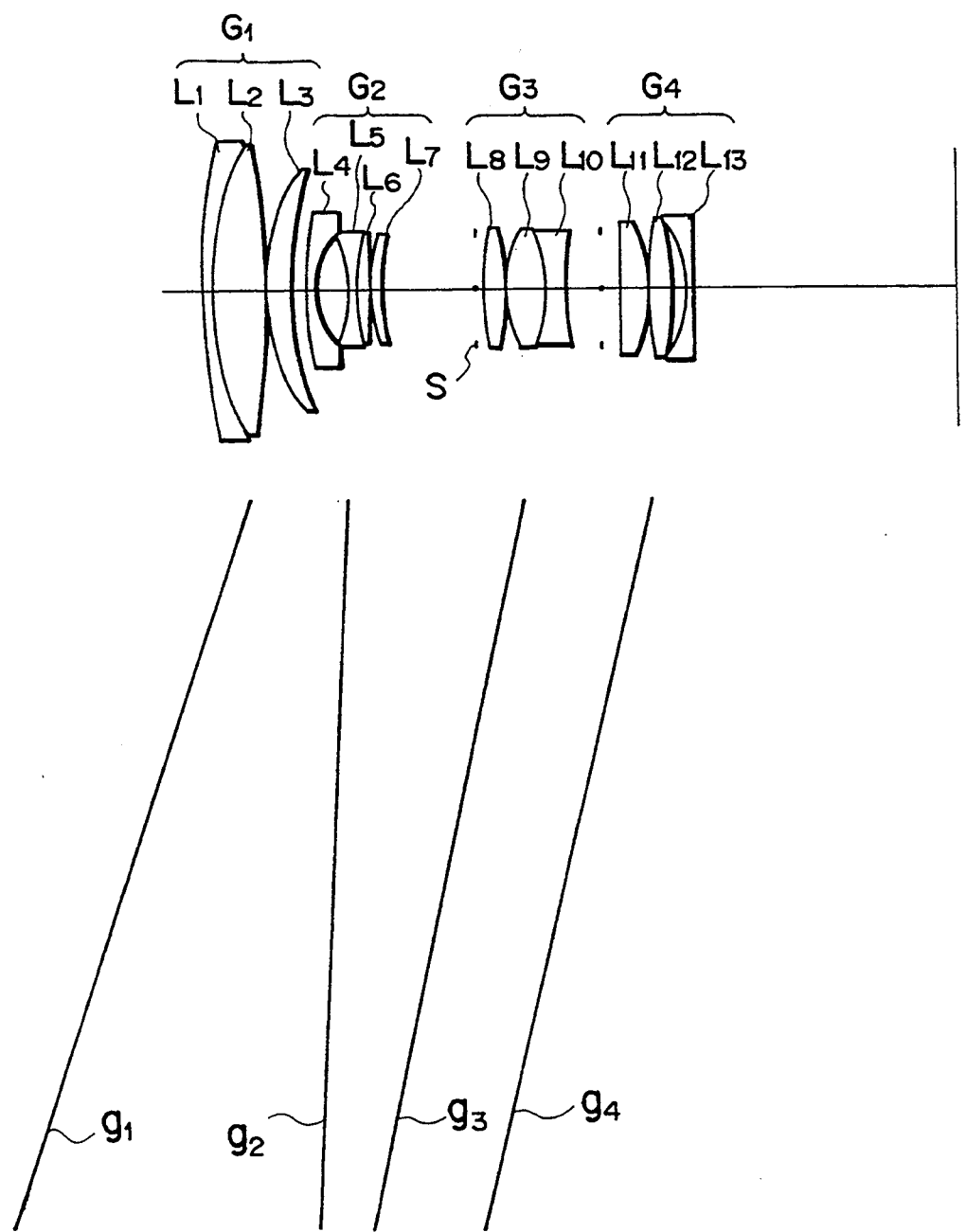
FIG. 1 shows the lens construction of the zoom lens system of Embodiment 1 of the present invention and an example of the movement locus of each lens unit for zooming.

The zoom lens of Embodiment 1, as shown in FIG. 1, comprises, in succession from the object side, a first lens unit G1 of positive refractive power, a second lens unit G2 of negative refractive power, a third lens unit G3 of positive refractive power and a fourth lens unit G4 of positive refractive power, and is of such a construction that during zooming from the wide angle side to the telephoto side, all lens units are moved toward the object side along the optical axis thereof and during focusing, the second lens unit G2 is moved toward the object side on the optical axis.

Describing the construction of each lens unit, the first lens unit G1 of positive refractive power comprises a negative meniscus lens $L_1$ having its convex surface facing the object side, a biconvex lens $L_2$ cemented thereto and a positive meniscus lens $L_3$ having its convex surface facing the object side, the second lens unit G2 of negative refractive power comprises a negative meniscus lens $L_4$ having its surface of sharper curvature facing the image side, a biconcave negative lens $L_5$, a convex meniscus lens $L_6$ cemented thereto and a positive meniscus lens $L_7$ having its convex surface facing the object side, the third lens unit G3 of positive refractive power comprises a biconvex positive lens $L_8$, a biconvex positive lens $L_9$ and a negative lens $L_{10}$ cemented thereto, and the fourth lens unit G4 of positive refractive power comprises a positive lens $L_{11}$, a biconvex positive lens $L_{12}$ and a negative meniscus lens $L_{13}$ having its surface of sharper curvature facing the object side. A stop S is disposed integrally with the third lens unit G3 on the object side of the third lens unit G3.

The numerical data of this zoom lens will be shown in Table 1 below. In Table 1, f represents the focal length, and FN represents F-number. In Table 1, r represents the radius of curvature of each lens surface, d represents the spacing between adjacent lens surfaces, n represents the refractive index of each lens, V represents Abbe number, and the suffix numbers indicate the order from the object side. The middle stage in Table 1 shows the value of each coefficient representing the shape of an aspherical surface formed on the object side lens surface (r6) of the object side lens $L_4$ in the second lens unit G2.

When the height from the optical axis is h and the distance from the tangential plane of the vertex of the aspherical surface at the height h is x and the cone constant is k and the second, fourth, sixth, eighth and tenth aspherical surface coefficients are $A_2$, $A_4$, $A_6$, $A_8$ and $A_{10}$, respectively, and the paraxial radius of curvature is r, the aspherical surface is expressed by the following aspherical surface equation:

$$X = \frac{h^2/r}{1 + (1 - kh^2/r^2)^{\frac{1}{2}}} + \sum_{i=1}^{5} A_{2i} \cdot h^{2i}$$

In the middle stage of Table 1 showing the numerical data of the lens system and the values of the cone constant k, the second, fourth, sixth, eighth and tenth aspherical surface coefficients $A_2$, $A_4$, $A_6$, $A_8$ and $A_{10}$ are shown in succession from left. $E_{-n}$ in the values of the aspherical surface coefficients represents $10^{-n}$.

Also, the lower stage of Table 1 shows the spacings between adjacent lens units at six zoom positions (f=36.0, 50.0, 60.0, 70.0, 85.0, 103.0) from the wide angle end to the telephoto end.

In FIG. 1, the movement locus of each lens unit during zooming is also shown. Here, the amount of movement in the direction of the optical axis and the angle of rotation of the rotatable lens barrel are chosen so that the movement locus of the first lens unit G1 during zooming may become a straight line.

In this zoom lens, the amount of movement $\Delta X$ of the second lens unit G2 in the direction of the optical axis for being focused on an object at a photographing distance of 0.85 m is first calculated. $\Delta X$ corresponding to each focal length found in this manner is shown in Table 2 below.

Consider that by the use of this $\Delta X$, the focusing cam for the second lens unit G2 which is the focusing lens unit as previously described is determined.

Supposing that the full angle of rotation including the zooming and focusing of the second lens unit which is the focusing lens unit is cut into three in the full periphery 360° with eccentricity or the like taken into account, the full angle of rotation is set to 110° in the present embodiment. Here, both of the angle of rotation from the wide angle end to the telephoto end during zooming and the angle of rotation for focusing are set to 55°. By doing this, it becomes possible to enhance the operability and accuracy of both of focusing and zooming. That is, it is originally desirable that the angle of rotation for focusing be greater, but there is a limit to the combined angle of rotation for focusing and zooming (in the present embodiment, 110°) and therefore, if the angle of rotation for focusing is too great, the angle of rotation for zooming will become small and the operability of zooming will be reduced.

Now, as regards a method of determining the focus cam $g_F$, when as specifically shown in FIG. 2, the coordinates on the focusing cam at the focal length f=f' (f'=36, 50, 60, 70, 85, 103) and at a photographing distance of infinity are $(X;\theta)=(X_{f=f', R=un}; \theta_{f=f'})$ and the amount of axial movement corresponding to a photographing distance R=0.85 m is $\Delta X_{f=f', R=850}$, the movement locus for focus can be determined so that coordinates corresponding to the focal length f=f' and the photographing distance R=0.85 m may be $$(X;\theta) = (X_{f=f, R=un} + \Delta X_{f=f, R=850}; \theta_{f=f} + 55),$$

where R=un represents that the photographing distance is infinity.

When the movement locus for focusing is found in this manner, the typical point $(X;\theta)=(0;0)$ of the movement locus for focusing represents f=36, R=un, and $(X;\theta)=(1.0365;55)$ represents f=103, R=un and f=36, R=850. $(X;\theta)=(5.1165;110)$ represents f=103, R=850. In this method, however, a desired amount of axial movement is obtained with regard to the photographing distance R=850 mm and therefore, the imaging plane is kept constant, but with regard to any photographing distance, whether the imaging point is kept near the imaging plane is not always ensured.

Accordingly, in the present embodiment, an optimizing method has been used to determine the movement locus for focusing so that the amount of displacement of the imaging point may become small even at the photographing distance R=1.0, 1.5, 2.0, 3.0, 5.0 m.

That is, when the amount of displacement of the imaging point at a focal length $f_i$ and a photographing distance $R_j$ is $DX_{ij}$, a single evaluation function $\phi$ has been determined as follows:

$$\phi = \sum_{i=1}^{m} \sum_{j=1}^{n} (g_{ij} DX_{ij})^2, \quad (1)$$

where $g_{ij}$ is a weight of the degree of relative importance of $DX_{ij}$, m=n=6, $f_i$=36, 50, 60, 70, 85, 103 mm, and $R_j$=0.85, 1.0, 1.5, 2.0, 3.0, 5.0 m, and chiefly $\theta_{f=f}$ (the $\theta$ coordinates of $f_i$=36, 50, 60, 70, 85, 103 at R=un) and $\phi_{R=R'}$ (the angle of rotation for focusing necessary to focus to each photographing distance) have been varied as variables so as to minimize equation (1), thereby determining the focus cam.

Figure 3:
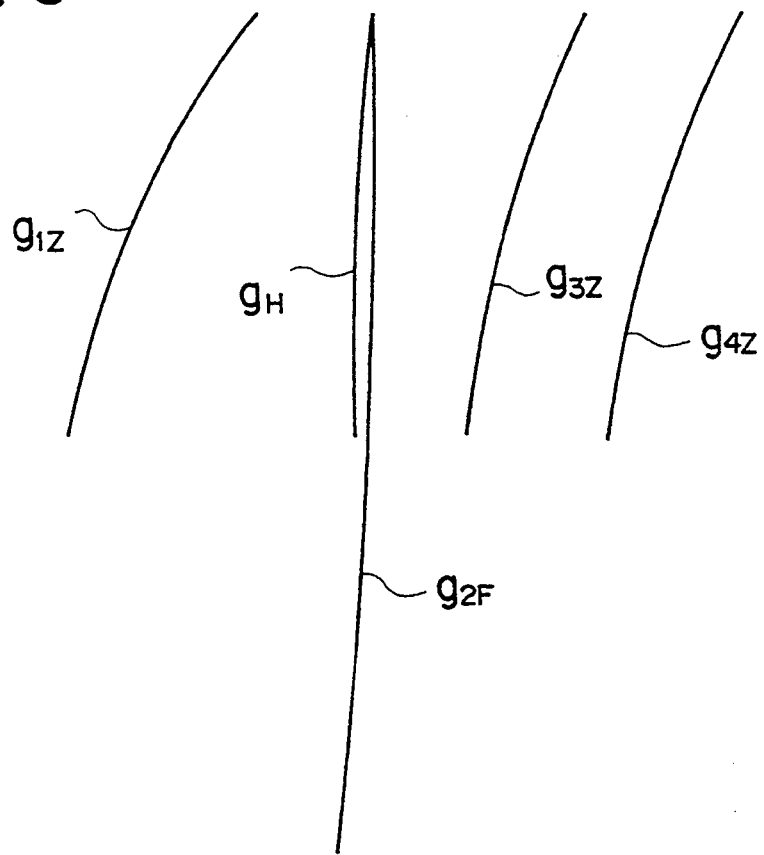
FIG. 3 shows the finally divided cams of respective lens units according to Embodiment 1.

Numerical values representative of the focusing cam found in this manner are shown in Table 3 below. All cams including the focus cam $g_{2F}$ determined in accordance with the relation between the angle of rotation $\theta$(ANGLE) and focal lengths shown in this table and the zoom compensation cam $g_H$ and further, zoom cams $g_{1Z}$, $g_{3Z}$ and $g_{4Z}$ for the non-focusing lens units G1, G3 and G4, respectively, are shown in FIG. 3.

Numerical values representative of the zoom compensation cam $g_H$ are shown in Table 4 below, and numerical values representative of zoom cams $g_{1Z}$, $g_{3Z}$ and $g_{4Z}$ for the first lens unit G1, the third lens unit G3 and the fourth lens unit G4, respectively, are shown in Table 5 below.

Here as regards the focusing cam $g_{2F}$ for the second lens unit G2 and the zoom compensation cam $g_H$, within the range of $0 \leq \theta \leq 55°$ of the angle of rotation used during zooming, the movement form of the second lens unit G2 is determined by the combined movement locus of the both cams, and this locus coincides with the locus along which the second lens unit is moved during zooming. Also, the zoom cams $g_{1Z}$, $g_{3Z}$ and $g_{4Z}$ for the non-focusing lens units G1, G3 and G4, respectively, and the zoom compensation cam $g_H$ determine the movement loci of the non-focusing lens unit G1, G3 and G4 during zooming by the combined movement of the respective cams.

Accordingly, actually the zoom compensation cam is determined by subtracting the focusing cam from the movement locus of the focusing lens unit during zooming before division. The zoom cams for the non-focusing lens units G1, G3 and G4 are determined by subtracting the zoom compensation cam from the movement loci of the respective lens units during zooming before division.

Figure 4:
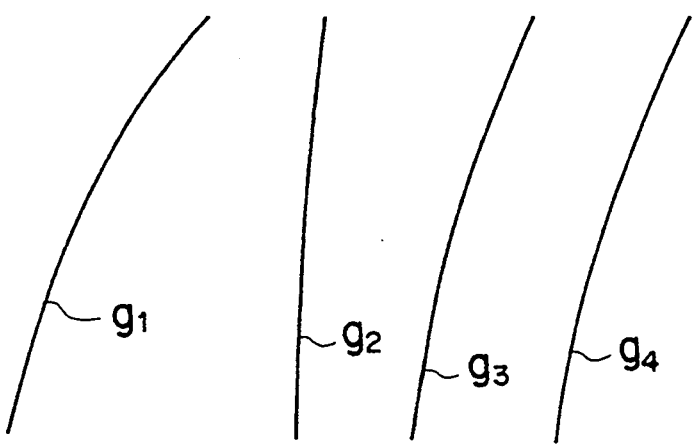
FIG. 4 shows combined movement loci for zooming according to Embodiment 1.

Next, the combined movement locus during this zooming, in other words, the movement locus before devision in the final sense, is shown in FIG. 4, and numerical values representative of that movement locus are shown in Table 6 below.

As can be seen from FIGS. 3 or 4, according to the present invention, when the focus cam is determined so as to suppress the amount of displacement of the imaging position to a small value, the movement loci of all the movable lens units and further, all the divided cams become non-linear relative to the angle of rotation of the lens barrel.

Figure 5:
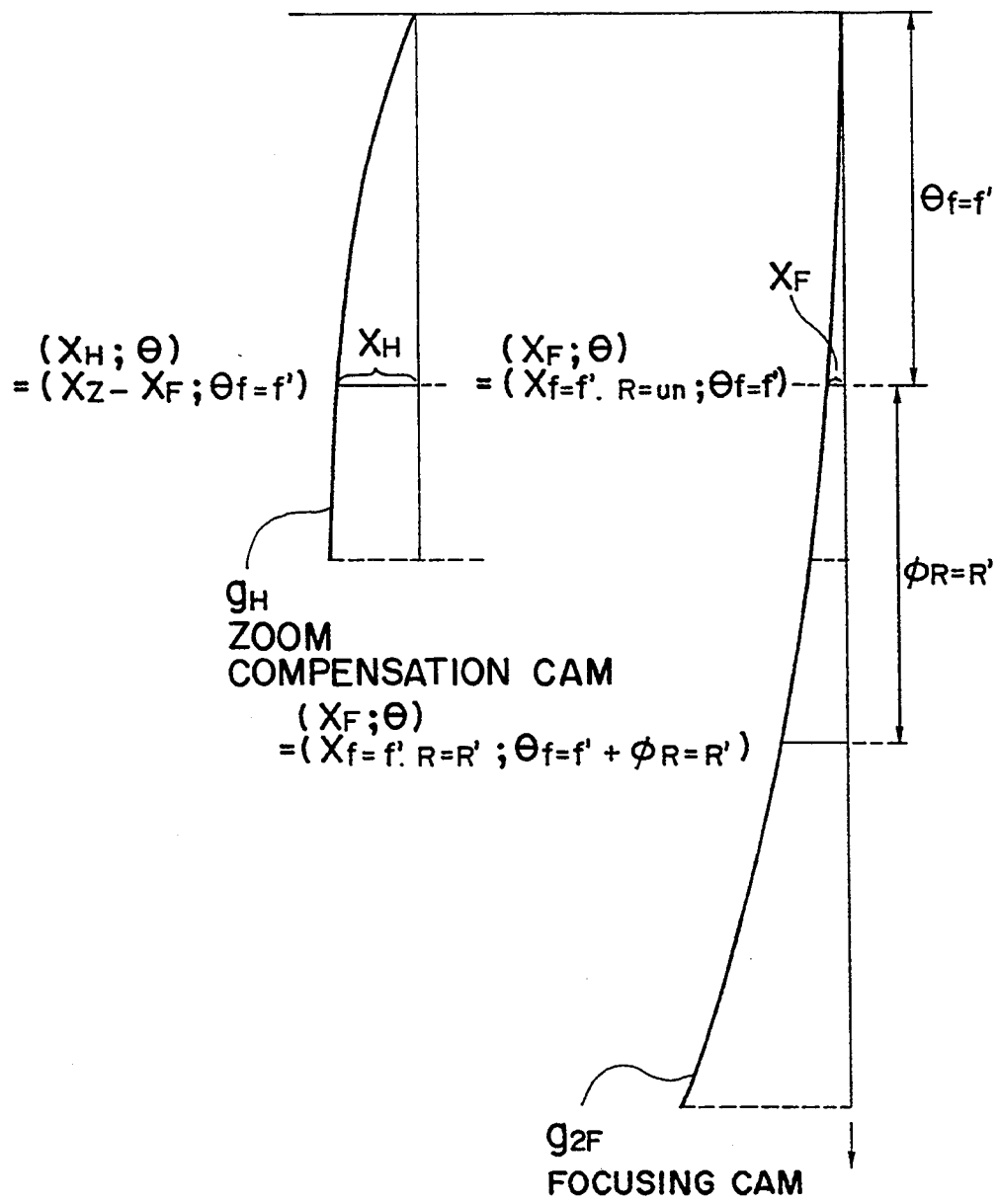
FIG. 5 illustrates the zooming and focusing operations of the focusing lens unit in the present invention.

FIG. 5 illustrates the focus cam $g_{2F}$ for the second lens unit G2 as the focusing lens unit in the present embodiment and the zoom compensation cam $g_H$. It is to be understood that in a state in which the photographing distance is infinity, the rotatable lens barrel is first rotatively moved by an angle of rotation of $\theta_{f=f}$, from the wide angle end (the upper end of FIG. 5) and zooming is performed to a focal length $f = f'$. At this time, the focusing lens unit is rotated on the rotatable lens barrel by $$\theta = \theta_{f=f'}$$

whereby it is moved on the focus cam in the direction of the optical axis by $$X_F = X_{f=f, R=un}.$$

At the same time, it is moved on the zoom compensation cam in the direction of the optical axis by $$X_H = X_Z - X_F.$$

These are combined in terms of the structure of hardware and the focusing lens unit is moved on the optical axis by $$X_H + X_F = X_Z$$

and contributes to zooming.

Next, consider that in the in-focus state, i.e., at a focal length $f = f'$, focusing is effected from a photographing distance of infinity to a photographing distance $R = R'$. When the angle of rotation of the rotatable lens barrel corresponding to the photographing distance $R = R'$ is $\phi_{R=R'}$, it is seen from FIG. 5 that the focusing lens unit is moved on the focus cam from $(X_{f=f, R=un}; \theta_{f=f})$ to $(X_{f=f, R=R'}; \theta_{f=f} + \phi_{R=R'})$. Thus, the focusing lens unit is moved on the optical axis by $$\Delta X = X_{f=f, R=R'} - X_{f=f, R=un}$$

and focusing is effected.

Figure 6:
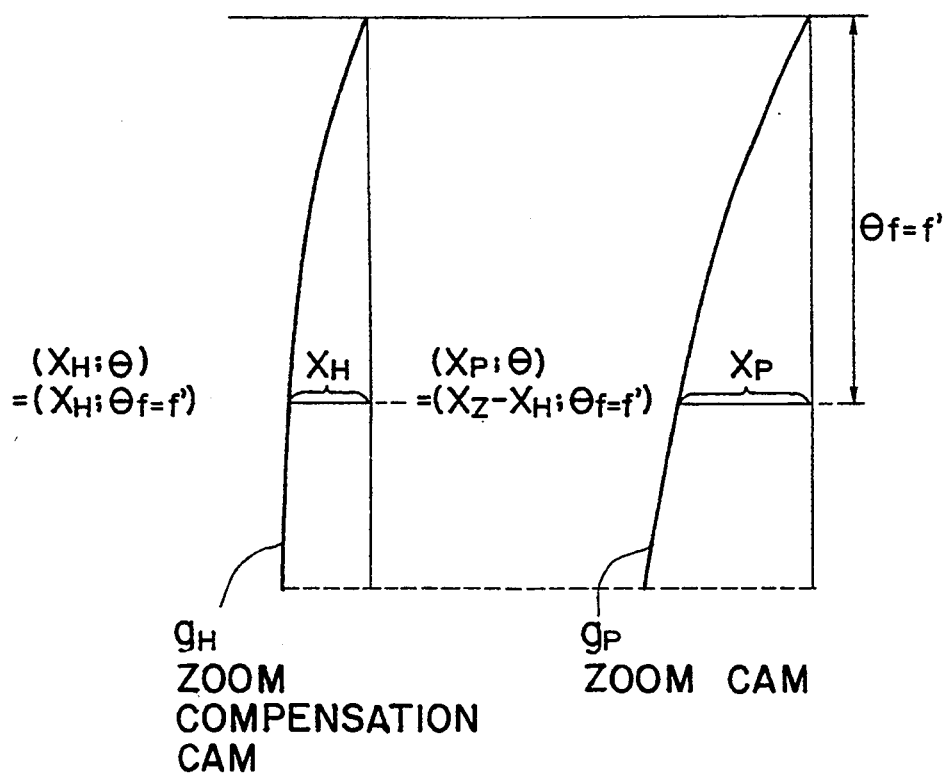
FIG. 6 illustrates the zooming operation of non-focusing lens units in the present invention.

FIG. 6 illustrates the zoom cams $g_{1Z}$, $g_{3Z}$ and $g_{4Z}$ ($= g_p$) for the first lens unit G1, the third lens unit G3 and the fourth lens unit G4, respectively, as the non-focusing lens units in the present embodiment and the zoom compensation cam $g_H$. It is to be understood that from the wide angle end (the upper end of FIG. 6), the rotatable lens barrel is first rotatively moved by an angle of rotation of $\theta_{f=f}$, and zooming is performed to the focal length $f = f'$. At this time, each lens unit is rotated on the rotatable lens barrel by $$\theta = \theta_{f=f'}$$

whereby it is moved on the zoom compensation cam in the direction of the optical axis by $$X_H = X_H.$$

At the same time, it is moved on the zoom cam in the direction of the optical axis by $$X_p = X_Z - X_H.$$

These are combined in terms of the structure of hardware and each non-focusing lens unit is moved on the optical axis by $$X_H + X_p = X_Z$$

and contributes to zooming.

Table 7 below shows the angles of rotation of the rotatable lens barrel (distance ring) for focusing when the photographing distance $R = 0.85$, 1.0, 1.5, 2.0, 3.0, 5.0 m in the zoom positions of the focal length $f = 36$, 50, 60, 70, 85, 103 mm when focusing is effected by the use of the focusing cam (Table 3) determined in the present embodiment, the actual amounts of axial movement $\Delta X(DX)$ of the focusing lens unit corresponding to these angles of rotation, and further the amounts of displacement (BF) of the imaging point when $\Delta X$ is given.

In Table 7, the upper stage shows the amounts of displacement (BF) of the imaging point for the various photographing distances R in the respective zoom positions, and the middle stage shows the angles of rotation of the rotatable lens barrel (distance ring) necessary for optimum focusing to be done for the respective photographing distances R. These angles of rotation for focusing have their values chosen such that the displacement of the imaging point becomes null at the wide angle end and the telephoto end. The lower stage shows the values of the actual amounts of axial movement $\Delta X(DX)$ of the respective lens units corresponding to the angles of rotation for focusing, with respect to cases where the photographing distances $R = 0.85$, 1.0, 1.5, 2.0, 3.0, 5.0 m in the zooming positions of the focal length $F = 36$, 50, 60, 70, 85, 103 mm. In the lower stage, the numbers at the left end indicate the focal lengths F of the entire system, the numbers at the right end indicate the photographing distances R, and the intermediate numbers are, in succession from left, the values of the actual amounts of axial movement ΔX(DX) of the first lens unit G1, the second lens unit G2, the third lens unit G3 and the fourth lens unit G4. With regard to all values, the case where the lens units are moved toward the object side is shown as positive values.

As can be seen from Table 7, the amounts of displacement of the imaging point for the respective focal lengths and photographing distances are very small and are sufficiently within the depth of focus in whatever zooming position and for every object distance.

Table 8 below shows the values of the angles of rotation for focusing necessary to optimize the amount of displacement of the imaging point resulting from focusing completely to zero which have been found from the focus cam with respect to the respective zooming positions and photographing distance R. In Table 8, the upper stage shows the optimum angles of rotation of the rotatable lens barrel (distance ring) for focusing when the photographing distance R=0.85, 1.0, 1.5, 2.0, 3.0, 5.0 m in the respective zooming positions of the focal length F=36, 50, 60, 70, 85, 103 mm, and the lower stage shows the values of the actual amounts of axial movement ΔX(DX) of each lens unit corresponding to the angles of rotation for focusing, with respect to cases where the photographing distance R=0.85, 1.0, 1.5, 2.0, 3.0, 5.0 m in the respective zooming positions of the focal length F=36, 50, 60, 70, 85, 103 mm.

It is seen from the values in the upper stage of Table 8 that the values of the angles of rotation for focusing are very approximate to one another with respect to the same photographing distance R and the amount of variation resulting from zooming has become very small. Accordingly, it is apparent that even when focusing is effected by the use of auto focusing, the amount of correction thereof is very slight and therefore the comformability of focusing becomes good.

Figure 7:
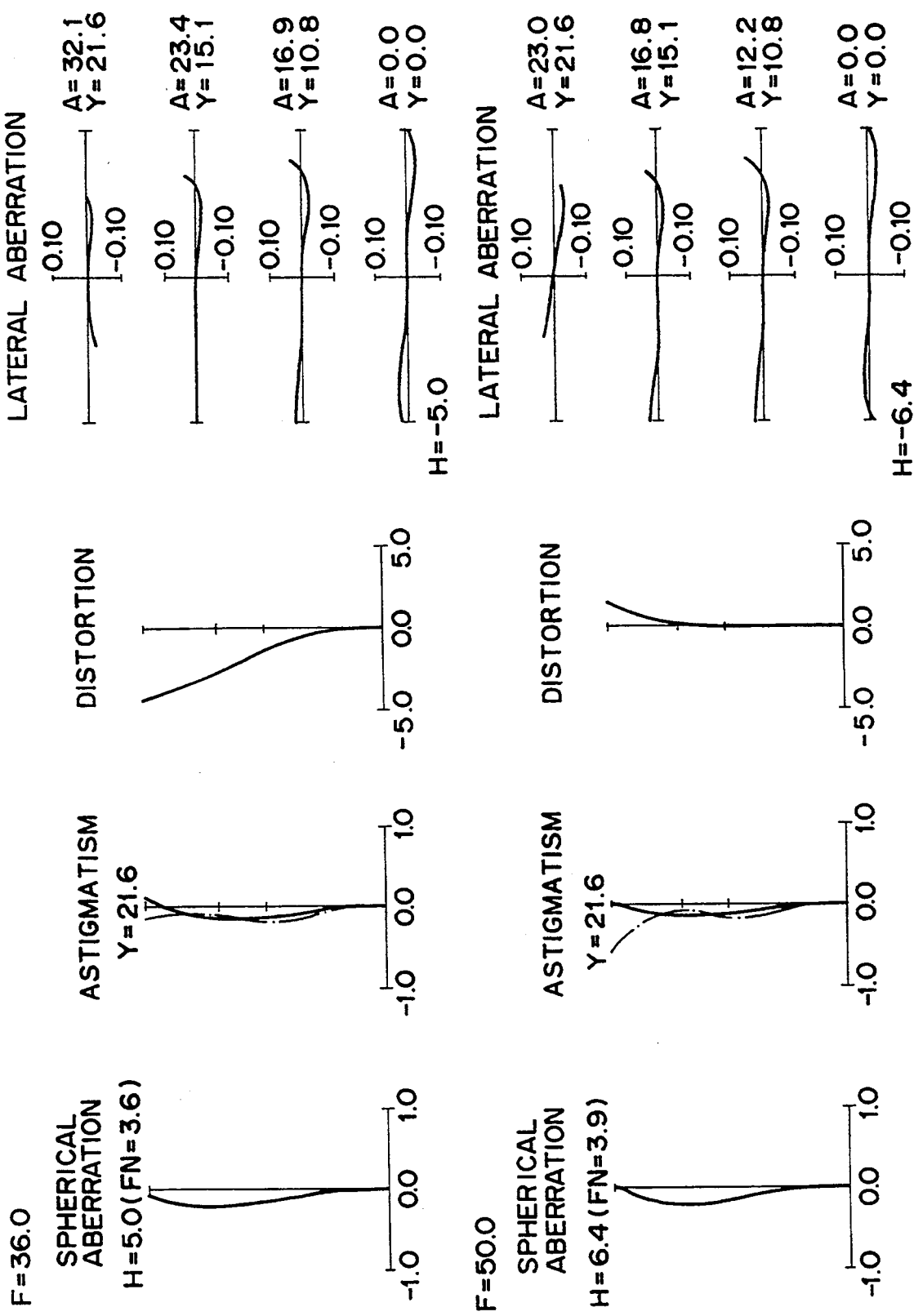
FIG. 7 shows various aberrations in Embodiment 1 when the focal length f=36, 50 mm and the photographing distance is infinity.
Figure 8:
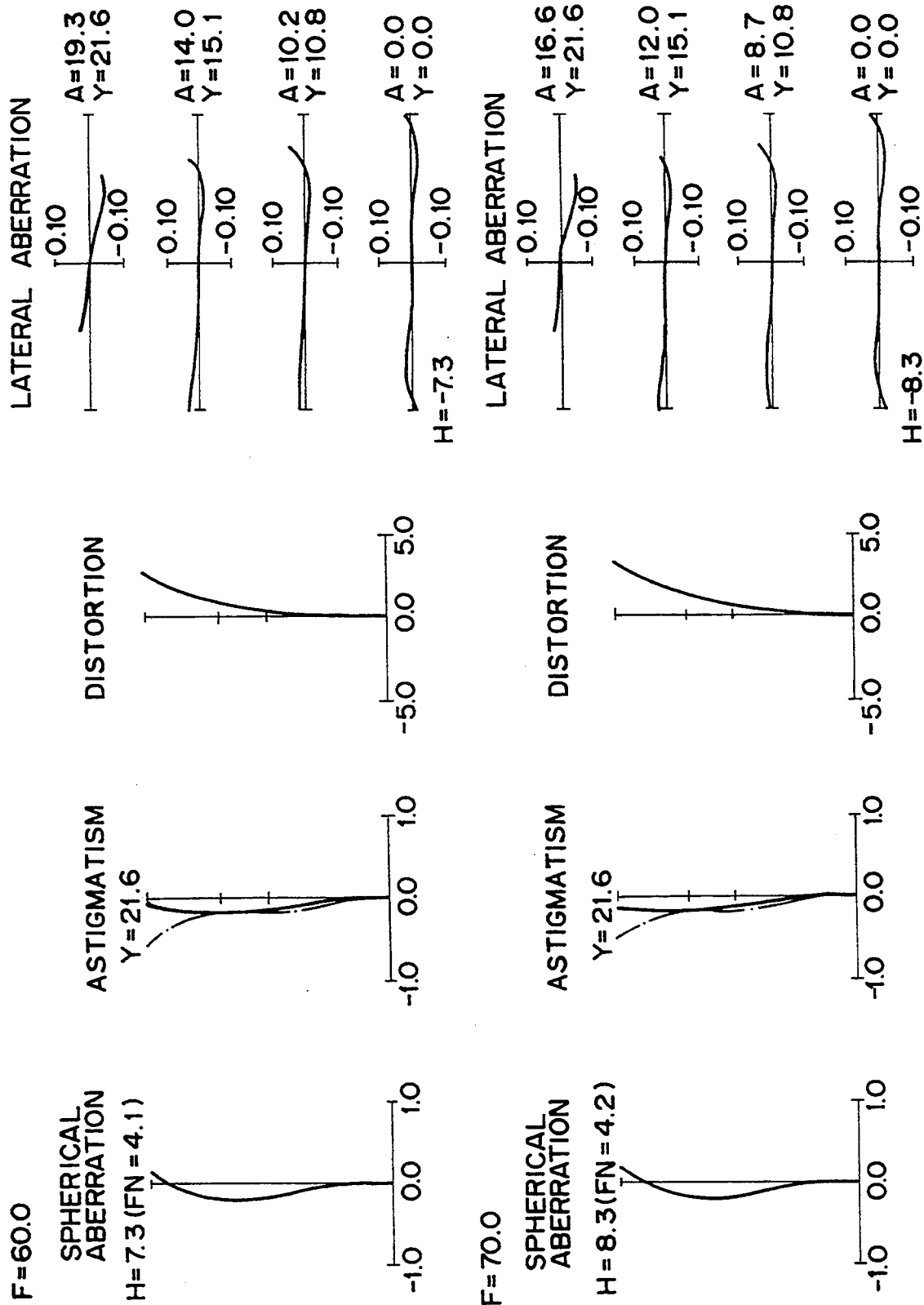
FIG. 8 shows various aberrations in Embodiment 1 when the focal length f=60, 70 mm and the photographing distance is infinity.
Figure 9:
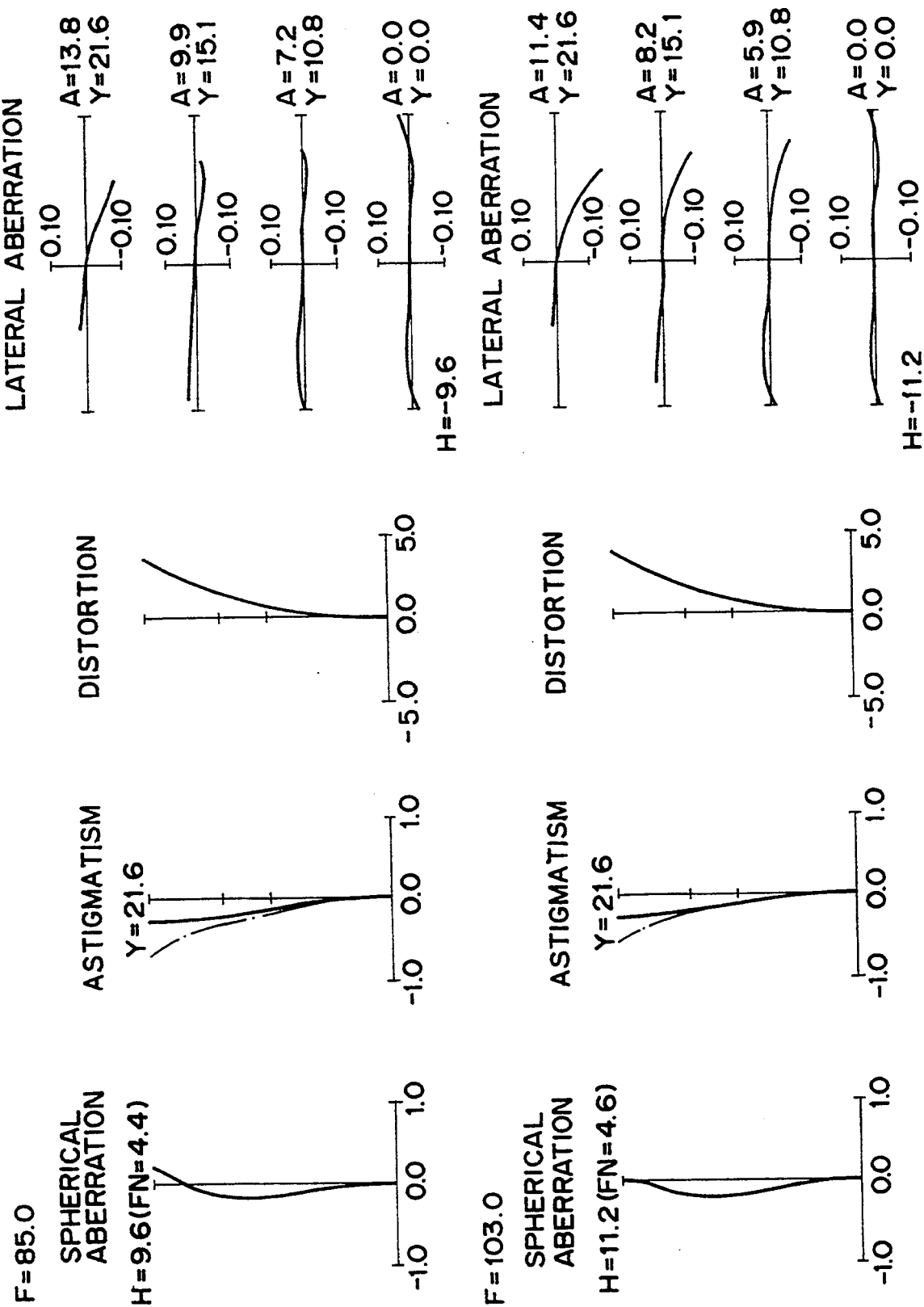
FIG. 9 shows various aberrations in Embodiment 1 when the focal length f=85, 103 mm and the photographing distance is infinity.
Figure 11:
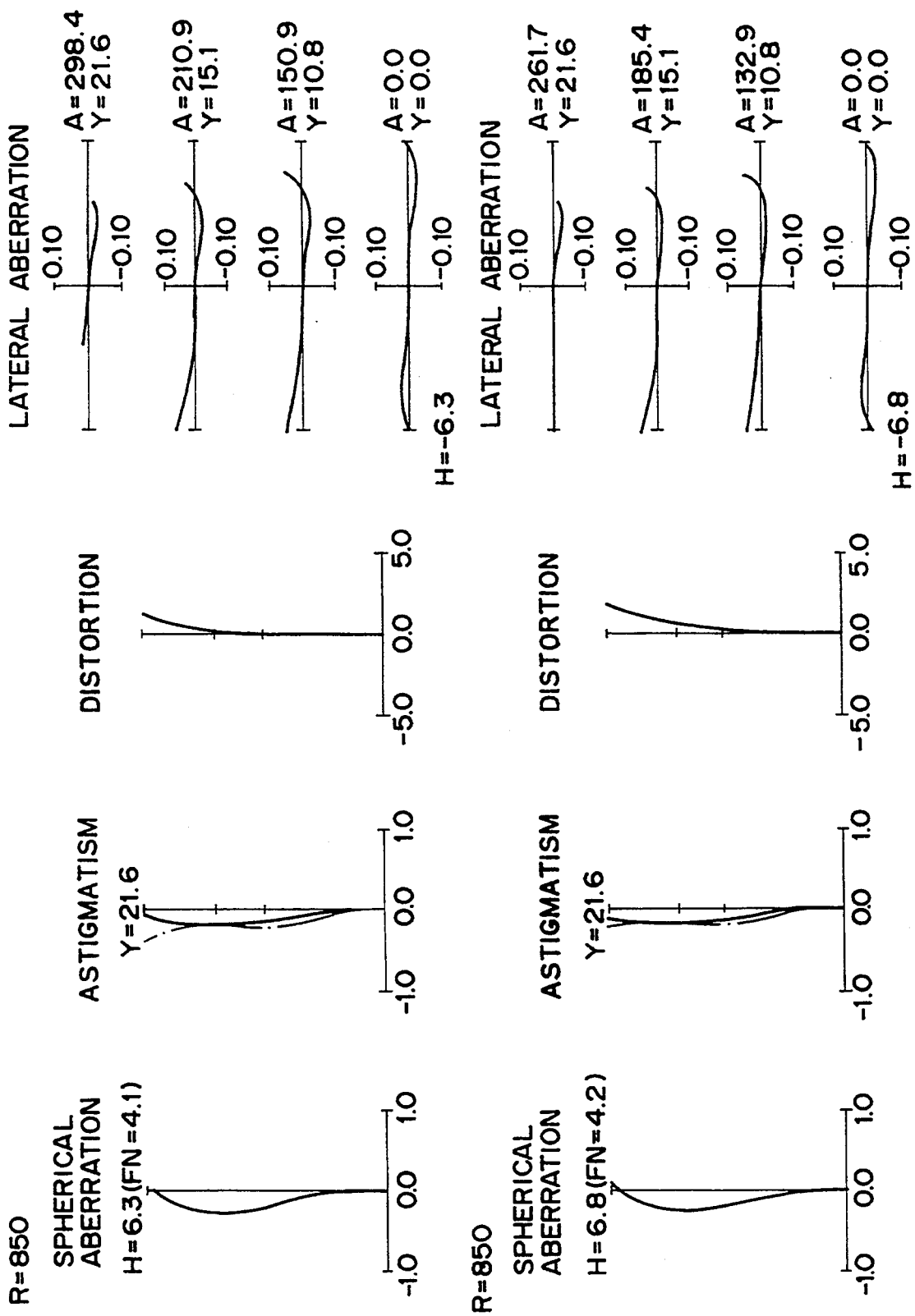
FIG. 11 shows various aberrations in Embodiment 1 when the focal length f=60, 70 mm and the photographing distance is 0.85 m.
Figure 12:
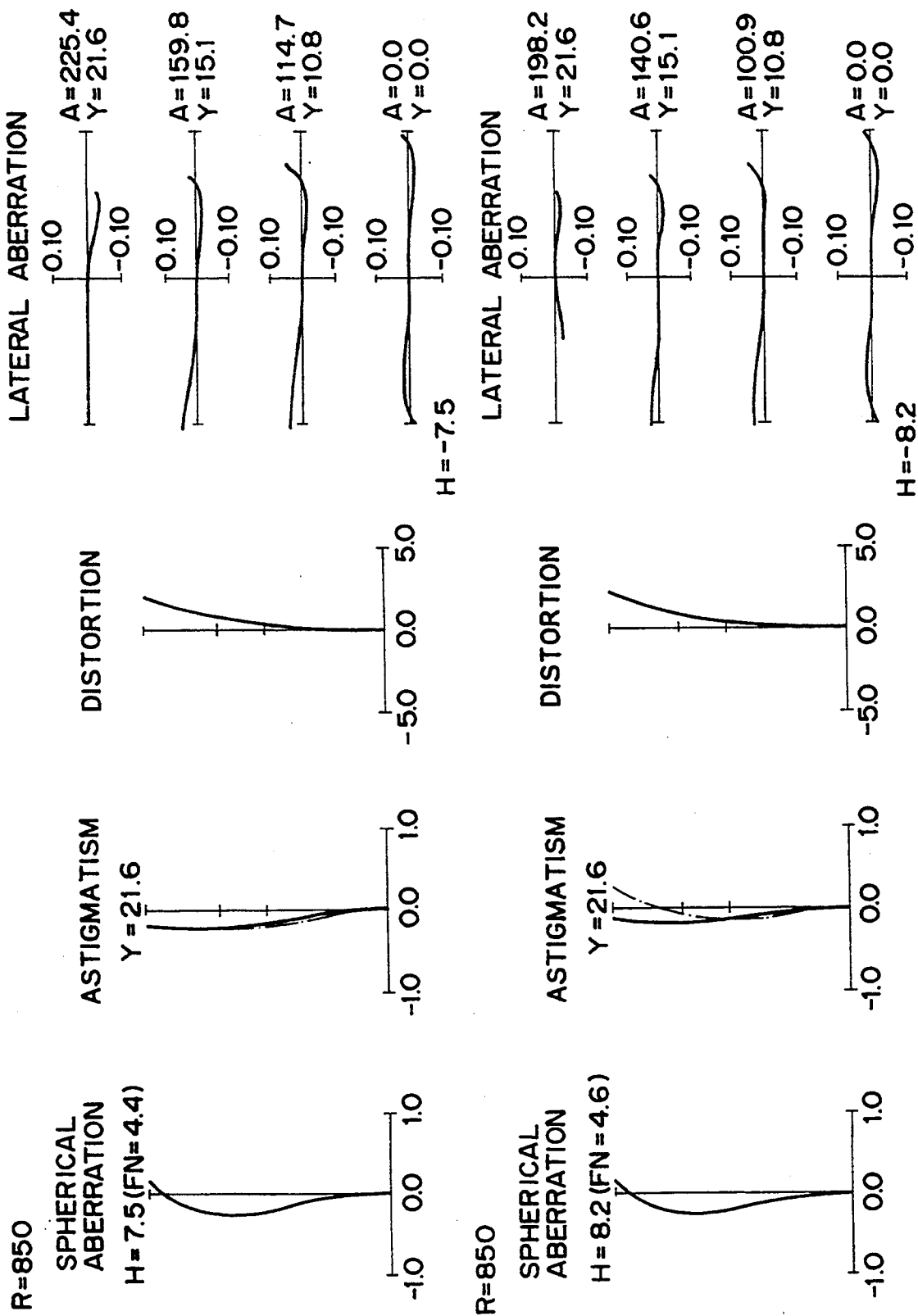
FIG. 12 shows various aberrations in Embodiment 1 when the focal length f=85, 103 mm and the photographing distance is 0.85 m.

FIGS. 7 to 9 show various aberrations in the respective zooming positions of the focal length F=36, 50, 60, 70, 85, 103 m when the photographing distance is infinity, with respect to the embodiment of the present invention. Also, FIGS. 10 to 12 show various aberrations when in the respective zooming positions of the focal length F=36, 50, 60, 70, 85, 103 m, focusing is effected to the photographing distance R=0.85 m by giving the amount of axial movement ΔX for focusing calculated from the focus cam obtained by the present invention.

It is apparent from these figures that the zoom lens according to the present invention of course maintains a good performance in all zooming ranges during infinity photographing and maintains an excellent imaging performance over all zooming ranges in a close distance photographing state as well.

Description of the Structure of the Lens Barrel

An embodiment of the zoom lens barrel by the movement loci of the lens units described with reference to FIGS. 3 and 4 will now be described with reference to FIGS. 13 and 14.

Figure 13:
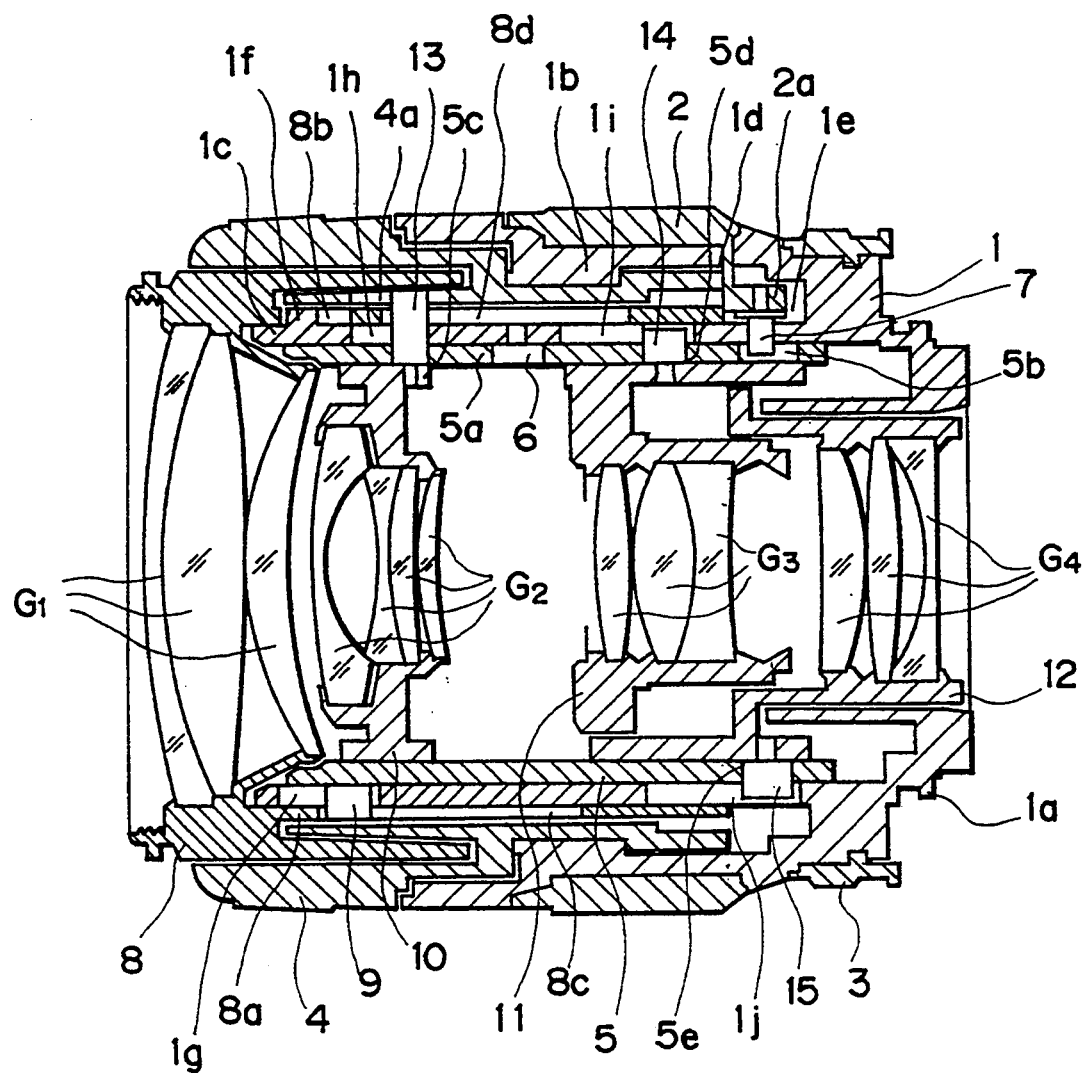
FIG. 13 is a longitudinal cross-sectional view of an embodiment of a zoom lens barrel according to the present invention.
Figure 14:
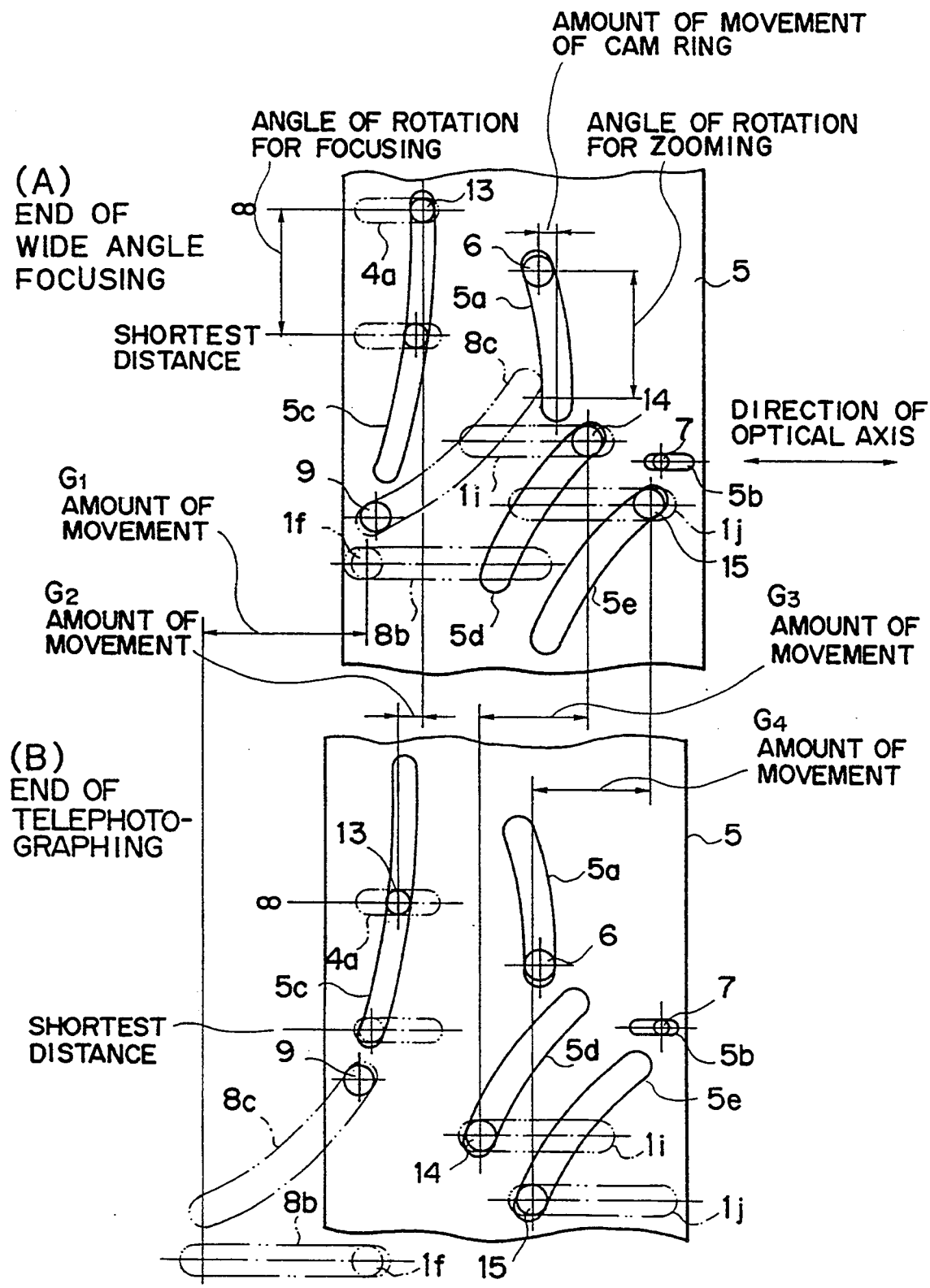
FIG. 14 is a developed view of cam slots and guide grooves in the embodiment of the zoom lens barrel according to the present invention.

In FIGS. 13 and 14, the reference numeral 1 designates a fixed barrel and a mount portion 1a to be mounted on a camera body (not shown) is integrally provided on that end thereof which is adjacent to the camera body.

A zoom ring 2 and an aperture ring 3 are fitted to the outer peripheral portion of the large-diametered portion 1b of the fixed barrel 1 for rotation by a predetermined angle.

Also, a distance ring 4 is fitted to the inner peripheral portion of the large-diametered portion 1b of the fixed barrel 1 for rotation by a predetermined angle.

A cam ring 5 is fitted to the inner peripheral portion of the small-diametered portion 1c of the fixed barrel 1 for rotation by a predetermined angle and for movement by a predetermined amount in the direction of the optical axis. The cam ring 5 is formed with a cam slot 5a corresponding to the aforedescribed zoom compensation cam, and a cam pin 6 studded in the small-diametered portion 1c of the fixed barrel 1 is fitted in the cam slot 5a. Also, the cam ring 5 is formed with a guide groove 5b parallel to the optical axis, and an interlocking pin 7 studded in the interlocking portion 2a of the zoom ring 2 is fitted in the guide groove 5b through escape grooves 1d and 1e formed in the outer peripheral portion and the inner peripheral portion, respectively, of the fixed barrel 1. Accordingly, the cam ring 5 is rotatable with the zoom ring 2 only in the direction of rotation.

The sliding portion 8a of a first lens unit holding barrel 8 for holding the first lens unit G1 is fitted to the outer peripheral portion of the small-diametered portion 1c of the fixed barrel 1 for rectilinear movement by a predetermined amount in the direction of the optical axis. The sliding portion 8a is formed with a guide groove 8b parallel to the optical axis and a cam slot 8c corresponding to the zoom cam for the first lens unit G1. A guide pin 1f provided on the outer periphery of the small-diametered portion 1c of the fixed barrel 1 is fitted in the guide groove 8b. A cam pin 9 studded on the outer periphery of the cam ring 5 is fitted in the cam slot 8c through an escape groove 1g formed in the small-diametered portion 1c of the fixed barrel 1.

A second lens unit holding barrel 10 for holding the second lens unit G2 is fitted to the inner peripheral portion of the cam ring 5 for rotation by a predetermined angle and for movement by a predetermined amount in the direction of the optical axis.

Also, a third lens unit holding barrel 11 for holding the third lens unit G3 and a fourth lens unit holding barrel 12 for holding the fourth lens unit G4 are fitted to the inner peripheral portion of the cam ring 5 for rectilinear movement by a predetermined amount in the direction of the optical axis.

A cam pin 13 is studded in the second lens unit holding barrel 10, and is fitted in a cam slot 5c corresponding to the focus cam for the second lens unit G2 which is formed in the cam ring 5, and is further fitted in a guide groove 4a parallel to the optical axis which is formed in the inner peripheral portion of the distance ring 4, through escape grooves 1h and 8d formed in the small-diametered portion 1c of the fixed barrel 1 and the sliding portion 8a of the first lens unit holding barrel 8, respectively.

A cam pin 14 is studded in the third lens unit holding barrel 11, and is fitted in a cam slot 5d corresponding to the zoom cam for the third lens unit G3 which is formed in the cam ring 5 and a guide groove 1i parallel to the optical axis which is formed in the small-diametered portion 1c of the fixed barrel 1. A cam pin 15 is studded in the fourth lens unit holding barrel 12, and is fitted in a cam slot 5e corresponding to the zoom cam for the fourth lens unit G4 which is formed in the cam ring 5 and a guide groove 1j parallel to the optical axis which is formed in the small-diametered portion 1c of the fixed barrel 1.

Description of the Operation of the Lens Barrel

The operation of the lens barrel having the above-described construction will now be described.

Description will first be made of the zooming operation.

When the zooming ring 2 is rotated, the cam ring 5 rotates through the interlocking portion 2a and the interlocking pin 7. At this time, the cam ring 5 is moved along the optical axis while rotating, in accordance with the zoom compensation cam of the cam slot 5a, by the cam pin 6 studded in the small-diametered portion 1c of the fixed barrel 1.

When the cam ring 5 is moved in the direction of the optical axis while rotating, the first lens unit holding barrel 8 is guided into the guide groove 8b which is formed in the sliding portion 8a and in which the guide pin 1f provided on the small-diametered portion 1c of the fixed barrel 1 is fitted, by the cam pin 9 provided on the cam ring 5, in accordance with the zoom cam for the first lens unit G1 in the cam slot 8c also formed in the sliding portion 8a, whereby it is rectilinearly moved in the direction of the optical axis.

Also, the second lens unit holding barrel 10 is rectilinearly moved in the direction of the optical axis by the pin 13 which is studded therein being guided into the guide groove 4a parallel to the optical axis which is formed in the inner peripheral portion of the distance ring 4, in accordance with the focus cam in the cam slot 5c formed in the cam ring 5.

Next, the third lens unit holding barrel 11 and the fourth lens unit holding barrel 12 are rectilinearly moved in the direction of the optical axis by the cam pins 14 and 15 which are studded in the respective lens unit holding barrels being guided into the guide grooves 1i and 1j parallel to the optical axis which are formed in the small-diametered portion 1c of the fixed barrel 1, in accordance with the zoom cams in the cam slots 5d and 5e formed in the cam ring 5.

The amount of movement of each lens unit holding barrel in the direction of the optical axis is the value of the zoom cams in the cam slots 8c, 5d and 5e or the focus cam in the cam slot 5c added to the zoom compensation cam in the cam slot 5a of the cam ring 5.

The movement locus of each lens unit during zooming shown in FIG. 4 is achieved by the above-described operation.

The focusing operation will now be described.

When the distance ring 4 is rotated, the second lens unit holding barrel 10 is moved in the direction of the optical axis while rotating, in accordance with the focus cam in the cam slot 5c, because the cam pin 13 studded in the second lens unit holding barrel 10 is fitted in the guide groove 4a in the inner peripheral portion which is parallel to the optical axis and this cam pin 13 is further fitted in the cam slot 5c in the cam ring 5 being stationary.

The movement locus of the second lens unit G2 during focusing shown in FIG. 3 is achieved by the above-described operation.

While in the present embodiment, the zoom cam for the first lens unit G1 is provided on the sliding portion 8a of the holding barrel 8 for the first lens unit G1, this cam may be provided on the cam ring 5.

In the above-described embodiment, the angle of rotation of the focusing lens unit is $55° + 55° = 110°$ for zooming and focusing, but this is because it is supposed that three sets of same cam loci are formed on the rotatable lens barrel, and where for example, two sets of same cam loci are only required, the angle of rotation can be secured more greatly (e.g. $110° < \theta < 180°$) and therefore, the angle of rotation for focusing and the angle of rotation for zooming can be secured more greatly.

Where both of the angle of rotation for focusing and the angle of rotation for zooming can be secured greatly, it is not always necessary to make the angle of rotation for focusing and the angle of rotation for zooming equal in value to each other as in the above-described embodiment. Further, the present invention is applicable to any lens unit in every zoom lens of two-or-more-unit construction if focusing is possible.

TABLE 1

| | | f = 36.0–103.0 | | FN = 3.6–4.6 | | | |
|---|---|---|---|---|---|---|---|
| r1 = | 113.125 | d1 = | 1.500 | n1 = 1.86074 | ν1 = 23.0 | L1 |
| r2 = | 58.096 | d2 = | 8.000 | n2 = 1.51860 | ν2 = 70.1 | L2 |
| r3 = | −132.377 | d3 = | .100 | | | |
| r4 = | 33.865 | d4 = | 3.800 | n3 = 1.65160 | ν3 = 58.5 | L3 |
| r5 = | 57.386 | d5 = | 2.285 | | | |
| r6 = | 52.180 | d6 = | 1.500 | n4 = 1.67025 | ν4 = 57.6 | L4 |
| r7 = | 12.729 | d7 = | 5.100 | | | |
| r8 = | 25.386 | d8 = | 1.100 | n5 = 1.74810 | ν5 = 52.3 | L5 |
| r9 = | 33.461 | d9 = | 2.300 | n6 = 1.86074 | ν6 = 23.0 | L6 |
| r10 = | 164.298 | d10 = | .100 | | | |
| r11 = | 26.737 | d11 = | 1.900 | n7 = 1.80458 | ν7 = 25.5 | L7 |
| r12 = | 48.903 | d12 = | 14.399 | | | |
| r13 = | .000 | d13 = | 1.000 | | | |
| r14 = | 48.706 | d14 = | 3.500 | n8 = 1.51860 | ν8 = 70.1 | L8 |
| r15 = | −40.457 | d15 = | .100 | | | |
| r16 = | 20.794 | d16 = | 6.200 | n9 = 1.50137 | ν9 = 58.5 | L9 |
| r17 = | −21.868 | d17 = | 3.000 | n10 = 1.80384 | ν10 = 33.9 | L10 |
| r18 = | 64.235 | d18 = | 5.600 | | | |
| r19 = | .000 | d19 = | 3.028 | | | |
| r20 = | −2358.593 | d20 = | 4.500 | n11 = 1.65844 | ν11 = 50.8 | L11 |
| r21 = | −23.264 | d21 = | .100 | | | |
| r22 = | 78.078 | d22 = | 3.300 | n12 = 1.62280 | ν12 = 57.0 | L12 |
| r23 = | −53.919 | d23 = | 2.400 | | | |
| r24 = | −19.264 | d24 = | 1.200 | n13 = 1.79631 | ν13 = 40.9 | L13 |
| r25 = | −205.722 | d25 = | 41.122 | | | |
| r6 = | .1000E + 01 | .0000 | −.3439E − 05 | −.6965E − 07 | | |
| | .4212E − 09 | −.1669E − 11 | | | | |

| | pos(1) | pos(2) | pos(3) | pos(4) | pos(5) | pos(6) |
|---|---|---|---|---|---|---|
| f&b | 36.000 | 30.000 | 60.000 | 70.000 | 85.000 | 103.000 |

TABLE 1-continued

| | | | | | | |
|---|---|---|---|---|---|---|
| d0 | .000 | .000 | .000 | .000 | .000 | .000 |
| d5 | 2.285 | 9.236 | 13.128 | 16.289 | 19.971 | 23.354 |
| d12 | 14.399 | 10.270 | 8.209 | 6.496 | 4.295 | 2.011 |
| d19 | 3.028 | 2.183 | 1.779 | 1.507 | 1.190 | 1.119 |
| d25 | 41.122 | 47.324 | 50.475 | 53.018 | 56.186 | 59.138 |

TABLE 2

| | F | (1) | (2) | (3) | (4) | R(mm) |
|---|---|---|---|---|---|---|
| 1 | 36.0000 | .0000 | 1.0365 | .0000 | .0000 | 850.00 |
| 2 | 50.0000 | .0000 | 1.4832 | .0000 | .0000 | 850.00 |
| 3 | 60.0000 | .0000 | 1.8716 | .0000 | .0000 | 850.00 |
| 4 | 70.0000 | .0000 | 2.3111 | .0000 | .0000 | 850.00 |
| 5 | 85.0000 | .0000 | 3.0486 | .0000 | .0000 | 850.00 |
| 6 | 103.0000 | .0000 | 4.0800 | .0000 | .0000 | 850.00 |

TABLE 3

| ANGLE | (2) | F | ANGLE | (2) | F |
|---|---|---|---|---|---|
| .0000 | .0000 | 36.0000 | | | |
| 1.0000 | .0075 | 37.1204 | 56.0000 | 1.0762 | .0000 |
| 2.0000 | .0151 | 38.2668 | 57.0000 | 1.1173 | .0000 |
| 3.0000 | .0228 | 39.4360 | 58.0000 | 1.1597 | .0000 |
| 4.0000 | .0305 | 40.6248 | 59.0000 | 1.2034 | .0000 |
| 5.0000 | .0383 | 41.8301 | 60.0000 | 1.2484 | .0000 |
| 6.0000 | .0463 | 43.0491 | 61.0000 | 1.2948 | .0000 |
| 7.0000 | .0544 | 44.2791 | 62.0000 | 1.3424 | .0000 |
| 8.0000 | .0627 | 45.5174 | 63.0000 | 1.3914 | .0000 |
| 9.0000 | .0713 | 46.7617 | 64.0000 | 1.4416 | .0000 |
| 10.0000 | .0801 | 48.0095 | 65.0000 | 1.4932 | .0000 |
| 11.0000 | .0892 | 49.2589 | 66.0000 | 1.5460 | .0000 |
| 12.0000 | .0986 | 50.5076 | 67.0000 | 1.6000 | .0000 |
| 13.0000 | .1083 | 51.7548 | 68.0000 | 1.6554 | .0000 |
| 14.0000 | .1184 | 53.0001 | 69.0000 | 1.7120 | .0000 |
| 15.0000 | .1289 | 54.2432 | 70.0000 | 1.7698 | .0000 |
| 16.0000 | .1398 | 55.4839 | 71.0000 | 1.8288 | .0000 |
| 17.0000 | .1511 | 56.7221 | 72.0000 | 1.8891 | .0000 |
| 18.0000 | .1630 | 57.9576 | 73.0000 | 1.9506 | .0000 |
| 19.0000 | .1753 | 59.1901 | 74.0000 | 2.0134 | .0000 |
| 20.0000 | .1881 | 60.4200 | 75.0000 | 2.0773 | .0000 |
| 21.0000 | .2015 | 61.6483 | 76.0000 | 2.1424 | .0000 |
| 22.0000 | .2154 | 62.8763 | 77.0000 | 2.2088 | .0000 |
| 23.0000 | .2298 | 64.1049 | 78.0000 | 2.2765 | .0000 |
| 24.0000 | .2448 | 65.3353 | 79.0000 | 2.3455 | .0000 |
| 25.0000 | .2602 | 66.5683 | 80.0000 | 2.4157 | .0000 |
| 26.0000 | .2762 | 67.8047 | 81.0000 | 2.4873 | .0000 |
| 27.0000 | .2928 | 69.0455 | 82.0000 | 2.5601 | .0000 |
| 28.0000 | .3098 | 70.2908 | 83.0000 | 2.6343 | .0000 |
| 29.0000 | .3274 | 71.5404 | 84.0000 | 2.7099 | .0000 |
| 30.0000 | .3456 | 72.7930 | 85.0000 | 2.7867 | .0000 |
| 31.0000 | .3644 | 74.0477 | 86.0000 | 2.8649 | .0000 |
| 32.0000 | .3838 | 75.3033 | 87.0000 | 2.9444 | .0000 |
| 33.0000 | .4039 | 76.5591 | 88.0000 | 3.0252 | .0000 |
| 34.0000 | .4245 | 77.8141 | 89.0000 | 3.1073 | .0000 |
| 35.0000 | .4459 | 79.0673 | 90.0000 | 3.1907 | .0000 |
| 36.0000 | .4679 | 80.3179 | 91.0000 | 3.2753 | .0000 |
| 37.0000 | .4906 | 81.5649 | 92.0000 | 3.3612 | .0000 |
| 38.0000 | .5140 | 82.8071 | 93.0000 | 3.4483 | .0000 |
| 39.0000 | .5382 | 84.0439 | 94.0000 | 3.5367 | .0000 |
| 40.0000 | .5631 | 85.2743 | 95.0000 | 3.6262 | .0000 |
| 41.0000 | .5887 | 86.4976 | 96.0000 | 3.7168 | .0000 |
| 42.0000 | .6152 | 87.7139 | 97.0000 | 3.8087 | .0000 |
| 43.0000 | .6424 | 88.9236 | 98.0000 | 3.9017 | .0000 |
| 44.0000 | .6705 | 90.1274 | 99.0000 | 3.9959 | .0000 |
| 45.0000 | .6993 | 91.3257 | 100.0000 | 4.0914 | .0000 |
| 46.0000 | .7290 | 92.5190 | 101.0000 | 4.1882 | .0000 |
| 47.0000 | .7595 | 93.7077 | 102.0000 | 4.2863 | .0000 |
| 48.0000 | .7908 | 94.8923 | 103.0000 | 4.3857 | .0000 |
| 49.0000 | .8231 | 96.0735 | 104.0000 | 4.4865 | .0000 |
| 50.0000 | .8582 | 97.2512 | 105.0000 | 4.5887 | .0000 |
| 51.0000 | .8902 | 98.4261 | 106.0000 | 4.6923 | .0000 |
| 52.0000 | .9251 | 99.5950 | 107.0000 | 4.7972 | .0000 |
| 53.0000 | .9610 | 100.7513 | 108.0000 | 4.9031 | .0000 |
| 54.0000 | .9982 | 101.8885 | 109.0000 | 5.0096 | .0000 |
| 55.0000 | 1.0365 | 102.9999 | 110.0000 | 5.1165 | .0000 |

TABLE 4

| ANGLE | (2) | F |
|---|---|---|
| .0000 | .0000 | 36.0000 |
| 1.0000 | .1057 | 37.1204 |
| 2.0000 | .2108 | 38.2668 |
| 3.0000 | .3148 | 39.4360 |
| 4.0000 | .4175 | 40.6248 |
| 5.0000 | .5186 | 41.8301 |
| 6.0000 | .6178 | 43.0491 |
| 7.0000 | .7151 | 44.2791 |
| 8.0000 | .8101 | 45.5174 |
| 9.0000 | .9029 | 46.7617 |
| 10.0000 | .9932 | 48.0095 |
| 11.0000 | 1.0810 | 49.2589 |
| 12.0000 | 1.1662 | 50.5076 |
| 13.0000 | 1.2488 | 51.7548 |
| 14.0000 | 1.3287 | 53.0001 |
| 15.0000 | 1.4059 | 54.2432 |
| 16.0000 | 1.4804 | 55.4839 |
| 17.0000 | 1.5522 | 56.7221 |
| 18.0000 | 1.6213 | 57.9576 |
| 19.0000 | 1.6876 | 59.1901 |
| 20.0000 | 1.7513 | 60.4200 |
| 21.0000 | 1.8124 | 61.6483 |
| 22.0000 | 1.8710 | 62.8763 |
| 23.0000 | 1.9273 | 64.1049 |
| 24.0000 | 1.9813 | 65.3353 |
| 25.0000 | 2.0331 | 66.5683 |
| 26.0000 | 2.0828 | 67.8047 |
| 27.0000 | 2.1304 | 69.0455 |
| 28.0000 | 2.1760 | 70.2908 |
| 29.0000 | 2.2195 | 71.5404 |
| 30.0000 | 2.2611 | 72.7930 |
| 31.0000 | 2.3007 | 74.0477 |
| 32.0000 | 2.3382 | 75.3033 |
| 33.0000 | 2.3738 | 76.5591 |
| 34.0000 | 2.4075 | 77.8141 |
| 35.0000 | 2.4391 | 79.0673 |
| 36.0000 | 2.4689 | 80.3179 |
| 37.0000 | 2.4966 | 81.5649 |
| 38.0000 | 2.5225 | 82.8071 |
| 39.0000 | 2.5464 | 84.0439 |
| 40.0000 | 2.5683 | 85.2743 |
| 41.0000 | 2.5884 | 86.4976 |
| 42.0000 | 2.6065 | 87.7139 |
| 43.0000 | 2.6228 | 88.9236 |
| 44.0000 | 2.6372 | 90.1274 |
| 45.0000 | 2.6499 | 91.3257 |
| 46.0000 | 2.6609 | 92.5190 |
| 47.0000 | 2.6701 | 93.7077 |
| 48.0000 | 2.6777 | 94.8923 |
| 49.0000 | 2.6837 | 96.0735 |
| 50.0000 | 2.6880 | 97.2512 |
| 51.0000 | 2.6907 | 98.4261 |
| 52.0000 | 2.6916 | 99.5950 |
| 53.0000 | 2.6906 | 100.7513 |
| 54.0000 | 2.6873 | 101.8885 |
| 55.0000 | 2.6814 | 102.9999 |

TABLE 5

| ANGLE | (1) | (3) | (4) | F |
|---|---|---|---|---|
| .0000 | .0000 | .0000 | .0000 | 36.0000 |
| 1.0000 | .6494 | .4240 | .4836 | 37.1204 |
| 2.0000 | 1.2951 | .8378 | .9636 | 38.2668 |
| 3.0000 | 1.9355 | 1.2407 | 1.4380 | 39.4360 |
| 4.0000 | 2.5688 | 1.6322 | 1.9048 | 40.6248 |
| 5.0000 | 3.1939 | 2.0119 | 2.3624 | 41.8301 |
| 6.0000 | 3.8095 | 2.3798 | 2.8093 | 43.0491 |
| 7.0000 | 4.4147 | 2.7357 | 3.2445 | 44.2791 |
| 8.0000 | 5.0089 | 3.0799 | 3.6668 | 45.5174 |
| 9.0000 | 5.5915 | 3.4126 | 4.0757 | 46.7617 |

TABLE 5-continued

| ANGLE | (1) | (3) | (4) | F |
|---|---|---|---|---|
| 10.0000 | 6.1620 | 3.7341 | 4.4705 | 48.0095 |
| 11.0000 | 6.7201 | 4.0448 | 4.8510 | 49.2589 |
| 12.0000 | 7.2657 | 4.3449 | 5.2167 | 50.5076 |
| 13.0000 | 7.7985 | 4.6353 | 5.5682 | 51.7548 |
| 14.0000 | 8.3187 | 4.9168 | 5.9067 | 53.0001 |
| 15.0000 | 8.8262 | 5.1900 | 6.2332 | 54.2432 |
| 16.0000 | 9.3210 | 5.4558 | 6.5487 | 55.4839 |
| 17.0000 | 9.8034 | 5.7146 | 6.8541 | 56.7221 |
| 18.0000 | 10.2736 | 5.9672 | 7.1503 | 57.9576 |
| 19.0000 | 10.7317 | 6.2140 | 7.4381 | 59.1901 |
| 20.0000 | 11.1782 | 6.4555 | 7.7183 | 60.4200 |
| 21.0000 | 11.6136 | 6.6924 | 7.9919 | 61.6483 |
| 22.0000 | 12.0386 | 6.9251 | 8.2597 | 62.8763 |
| 23.0000 | 12.4536 | 7.1542 | 8.5227 | 64.1049 |
| 24.0000 | 12.8592 | 7.3802 | 8.7816 | 65.3353 |
| 25.0000 | 13.2558 | 7.6034 | 9.0370 | 66.5683 |
| 26.0000 | 13.6439 | 7.8241 | 9.2896 | 67.8047 |
| 27.0000 | 14.0239 | 8.0428 | 9.5399 | 69.0455 |
| 28.0000 | 14.3959 | 8.2595 | 9.7883 | 70.2908 |
| 29.0000 | 14.7603 | 8.4743 | 10.0348 | 71.5404 |
| 30.0000 | 15.1171 | 8.6872 | 10.2790 | 72.7930 |
| 31.0000 | 15.4666 | 8.8981 | 10.5208 | 74.0477 |
| 32.0000 | 15.8088 | 9.1070 | 10.7597 | 75.3033 |
| 33.0000 | 16.1440 | 9.3139 | 10.9955 | 76.5591 |
| 34.0000 | 16.4725 | 9.5187 | 11.2281 | 77.8141 |
| 35.0000 | 16.7942 | 9.7215 | 11.4573 | 79.0673 |
| 36.0000 | 17.1094 | 9.9222 | 11.6829 | 80.3179 |
| 37.0000 | 17.4182 | 10.1209 | 11.9048 | 81.5649 |
| 38.0000 | 17.7208 | 10.3175 | 12.1229 | 82.8071 |
| 39.0000 | 18.0173 | 10.5120 | 12.3370 | 84.0439 |
| 40.0000 | 18.3077 | 10.7045 | 12.5472 | 85.2743 |
| 41.0000 | 18.5923 | 10.8950 | 12.7535 | 86.4976 |
| 42.0000 | 18.8714 | 11.0836 | 12.9561 | 87.7139 |
| 43.0000 | 19.1452 | 11.2706 | 13.1552 | 88.9236 |
| 44.0000 | 19.4140 | 11.4560 | 13.3510 | 90.1274 |
| 45.0000 | 19.8783 | 11.6400 | 13.5438 | 91.3257 |
| 46.0000 | 19.9382 | 11.8229 | 13.7337 | 92.5190 |
| 47.0000 | 20.1940 | 12.0047 | 13.9211 | 93.7077 |
| 48.0000 | 20.4460 | 12.1855 | 14.1060 | 94.8923 |
| 49.0000 | 20.6945 | 12.3657 | 14.2886 | 96.0735 |
| 50.0000 | 20.9395 | 12.5451 | 14.4691 | 97.2512 |
| 51.0000 | 21.1814 | 12.7240 | 14.6477 | 98.4261 |
| 52.0000 | 21.4197 | 12.9020 | 14.8241 | 99.5950 |
| 53.0000 | 21.6536 | 13.0786 | 14.9977 | 100.7513 |
| 54.0000 | 21.8822 | 13.2530 | 15.1680 | 101.8885 |
| 55.0000 | 22.1049 | 13.4248 | 15.3345 | 102.9999 |

TABLE 6

| ANGLE | (1) | (2) | (3) | (4) | F |
|---|---|---|---|---|---|
| .0000 | .0000 | .0000 | .0000 | .0000 | 36.0000 |
| 1.0000 | .7551 | .1133 | .5297 | .5893 | 37.1204 |
| 2.0000 | 1.5059 | .2259 | 1.0486 | 1.1744 | 38.2668 |
| 3.0000 | 2.2503 | .3375 | 1.5555 | 1.7528 | 39.4360 |
| 4.0000 | 2.9863 | .4479 | 2.0497 | 2.3223 | 40.6248 |
| 5.0000 | 3.7124 | .5569 | 2.5305 | 2.8809 | 41.8301 |
| 6.0000 | 4.4273 | .6641 | 2.9976 | 3.4271 | 43.0491 |
| 7.0000 | 5.1298 | .7695 | 3.4508 | 3.9595 | 44.2791 |
| 8.0000 | 5.8191 | .8729 | 3.8900 | 4.4770 | 45.5174 |
| 9.0000 | 6.4944 | .9742 | 4.3155 | 4.9786 | 46.7617 |
| 10.0000 | 7.1552 | 1.0733 | 4.7273 | 5.4637 | 48.0095 |
| 11.0000 | 7.8011 | 1.1702 | 5.1258 | 5.9319 | 49.2589 |
| 12.0000 | 8.4319 | 1.2648 | 5.5111 | 6.3829 | 50.5076 |
| 13.0000 | 9.0473 | 1.3571 | 5.8841 | 6.8170 | 51.7548 |
| 14.0000 | 9.6474 | 1.4471 | 6.2455 | 7.2354 | 53.0001 |
| 15.0000 | 10.2321 | 1.5348 | 6.5959 | 7.6391 | 54.2432 |
| 16.0000 | 10.8014 | 1.6202 | 6.9362 | 8.0291 | 55.4839 |
| 17.0000 | 11.3556 | 1.7033 | 7.2668 | 8.4063 | 56.7221 |
| 18.0000 | 11.8949 | 1.7842 | 7.5885 | 8.7716 | 57.9576 |
| 19.0000 | 12.4193 | 1.8629 | 7.9016 | 9.1257 | 59.1901 |
| 20.0000 | 12.9294 | 1.9394 | 8.2068 | 9.4696 | 60.4200 |
| 21.0000 | 13.4260 | 2.0139 | 8.5047 | 9.8042 | 61.6483 |
| 22.0000 | 13.9096 | 2.0864 | 8.7961 | 10.1307 | 62.8763 |
| 23.0000 | 14.3809 | 2.1571 | 9.0815 | 10.4500 | 64.1049 |
| 24.0000 | 14.8405 | 2.2261 | 9.3615 | 10.7629 | 65.3353 |
| 25.0000 | 15.2889 | 2.2933 | 9.6365 | 11.0701 | 66.5683 |
| 26.0000 | 15.7267 | 2.3590 | 9.9069 | 11.3724 | 67.8047 |
| 27.0000 | 16.1542 | 2.4231 | 10.1731 | 11.6703 | 69.0455 |
| 28.0000 | 16.5719 | 2.4858 | 10.4354 | 11.9642 | 70.2908 |
| 29.0000 | 16.9798 | 2.5470 | 10.6938 | 12.2543 | 71.5404 |
| 30.0000 | 17.3782 | 2.6067 | 10.9483 | 12.5401 | 72.7930 |
| 31.0000 | 17.7672 | 2.6651 | 11.1988 | 12.8214 | 74.0471 |
| 32.0000 | 18.1470 | 2.7221 | 11.4452 | 13.0979 | 75.3033 |
| 33.0000 | 18.5179 | 2.7777 | 11.6877 | 13.3694 | 76.5591 |
| 34.0000 | 18.8799 | 2.8320 | 11.9262 | 13.6356 | 77.8141 |
| 35.0000 | 19.2333 | 2.8850 | 12.1606 | 13.8964 | 79.0673 |
| 36.0000 | 19.5783 | 2.9367 | 12.3911 | 14.1518 | 80.3179 |
| 37.0000 | 19.9149 | 2.9872 | 12.6175 | 14.4014 | 81.5649 |
| 38.0000 | 20.2433 | 3.0365 | 12.8399 | 14.6453 | 82.8071 |
| 39.0000 | 20.5636 | 3.0845 | 13.0584 | 14.8834 | 84.0439 |
| 40.0000 | 20.8760 | 3.1314 | 13.2728 | 15.1156 | 85.2743 |
| 41.0000 | 21.1807 | 3.1771 | 13.4834 | 15.3419 | 86.4976 |
| 42.0000 | 21.4779 | 3.2217 | 13.6901 | 15.5626 | 87.7139 |
| 43.0000 | 21.7679 | 3.2652 | 13.8933 | 15.7779 | 88.9236 |
| 44.0000 | 22.0513 | 3.3077 | 14.0932 | 15.9882 | 90.1274 |
| 45.0000 | 22.3282 | 3.3492 | 14.2899 | 16.1937 | 91.3257 |
| 46.0000 | 22.5991 | 3.3899 | 14.4838 | 16.3946 | 92.5190 |
| 47.0000 | 22.8642 | 3.4296 | 14.6748 | 16.5912 | 93.7077 |
| 48.0000 | 23.1238 | 3.4686 | 14.8633 | 16.7837 | 94.8923 |
| 49.0000 | 23.3781 | 3.5067 | 15.0493 | 16.9723 | 96.0735 |
| 50.0000 | 23.6275 | 3.5441 | 15.2330 | 17.1571 | 97.2512 |
| 51.0000 | 23.8720 | 3.5808 | 15.4146 | 17.3383 | 98.4261 |
| 52.0000 | 24.1113 | 3.6167 | 15.5936 | 17.5157 | 99.5950 |
| 53.0000 | 24.3442 | 3.6516 | 15.7691 | 17.6883 | 100.7513 |
| 54.0000 | 24.5695 | 3.6854 | 15.9403 | 17.8552 | 101.8885 |
| 55.0000 | 24.7863 | 3.7179 | 16.1062 | 18.0159 | 102.9999 |

TABLE 7

| | | R | 850.00 | 1000.00 | 1500.00 | 2000.00 | 3000.00 | 5000.00 |
|---|---|---|---|---|---|---|---|---|
| F | 36.0000 | BF | .0000 | .0000 | .0000 | .0000 | .0000 | .0000 |
| F | 50.0000 | BF | .0000 | .0124 | .0154 | .0058 | .0001 | −.0008 |
| F | 60.0000 | BF | .0000 | .0046 | .0217 | .0172 | −.0009 | −.0070 |
| F | 70.0000 | BF | .0000 | −.0063 | −.0004 | .0099 | .0079 | −.0067 |
| F | 85.0000 | BF | .0000 | −.0147 | −.0241 | −.0238 | −.0110 | .0050 |
| F | 103.0000 | BF | .0000 | .0003 | .0000 | .0002 | .0000 | .0002 |
| | ANGLE | DX | 55.0000 | 50.5534 | 40.5103 | 34.2346 | 26.5210 | 18.5794 |
| F | 36.0000 | DX | .0000 | 1.0365 | .0000 | .0000 | R | 850.00 |
| F | 50.0000 | DX | .0000 | 1.4832 | .0000 | .0000 | R | 850.00 |
| F | 60.0000 | DX | .0000 | 1.8716 | .0000 | .0000 | R | 850.00 |
| F | 70.0000 | DX | .0000 | 2.3111 | .0000 | .0000 | R | 850.00 |
| F | 85.0000 | DX | .0000 | 3.0486 | .0000 | .0000 | R | 850.00 |
| F | 103.0000 | DX | .0000 | 4.0800 | .0000 | .0000 | R | 850.00 |
| F | 36.0000 | DX | .0000 | .8749 | .0000 | .0000 | R | 1000.00 |
| F | 50.0000 | DX | .0000 | 1.2547 | .0000 | .0000 | R | 1000.00 |
| F | 60.0000 | DX | .0000 | 1.5986 | .0000 | .0000 | R | 1000.00 |
| F | 70.0000 | DX | .0000 | 1.9927 | .0000 | .0000 | R | 1000.00 |
| F | 85.0000 | DX | .0000 | 2.6611 | .0000 | .0000 | R | 1000.00 |
| F | 103.0000 | DX | .0000 | 3.6094 | .0000 | .0000 | R | 1000.00 |
| F | 36.0000 | DX | .0000 | .5760 | .0000 | .0000 | R | 1500.00 |
| F | 50.0000 | DX | .0000 | .8339 | .0000 | .0000 | R | 1500.00 |
| F | 60.0000 | DX | .0000 | 1.0724 | .0000 | .0000 | R | 1500.00 |
| F | 70.0000 | DX | .0000 | 1.3655 | .0000 | .0000 | R | 1500.00 |

TABLE 7-continued

| | | | | | | | | |
|---|---|---|---|---|---|---|---|---|
| F | 85.0000 | DX | .0000 | 1.8785 | .0000 | .0000 | R | 1500.00 |
| F | 103.0000 | DX | .0000 | 2.6357 | .0000 | .0000 | R | 1500.00 |
| F | 36.0000 | DX | .0000 | .4295 | .0000 | .0000 | R | 2000.00 |
| F | 50.0000 | DX | .0000 | .6289 | .0000 | .0000 | R | 2000.00 |
| F | 60.0000 | DX | .0000 | .8104 | .0000 | .0000 | R | 2000.00 |
| F | 70.0000 | DX | .0000 | 1.0369 | .0000 | .0000 | R | 2000.00 |
| F | 85.0000 | DX | .0000 | 1.4568 | .0000 | .0000 | R | 2000.00 |
| F | 103.0000 | DX | .0000 | 2.0902 | .0000 | .0000 | R | 2000.00 |
| F | 36.0000 | DX | .0000 | .2847 | .0000 | .0000 | R | 3000.00 |
| F | 50.0000 | DX | .0000 | .4219 | .0000 | .0000 | R | 3000.00 |
| F | 60.0000 | DX | .0000 | .5506 | .0000 | .0000 | R | 3000.00 |
| F | 70.0000 | DX | .0000 | .7034 | .0000 | .0000 | R | 3000.00 |
| F | 85.0000 | DX | .0000 | 1.0048 | .0000 | .0000 | R | 3000.00 |
| F | 103.0000 | DX | .0000 | 1.4883 | .0000 | .0000 | R | 3000.00 |
| F | 36.0000 | DX | .0000 | .1701 | .0000 | .0000 | R | 5000.00 |
| F | 50.0000 | DX | .0000 | .2540 | .0000 | .0000 | R | 5000.00 |
| F | 60.0000 | DX | .0000 | .3359 | .0000 | .0000 | R | 5000.00 |
| F | 70.0000 | DX | .0000 | .4337 | .0000 | .0000 | R | 5000.00 |
| F | 85.0000 | DX | .0000 | .6177 | .0000 | .0000 | R | 5000.00 |
| F | 103.0000 | DX | .0000 | .9504 | .0000 | .0000 | R | 5000.00 |

TABLE 8

| | | R | 850.00 | 1000.00 | 1500.00 | 2000.00 | 3000.00 | 5000.00 |
|---|---|---|---|---|---|---|---|---|
| F | 36.0000 | BF | 55.0000 | 50.5534 | 40.5103 | 34.2346 | 26.5210 | 18.5794 |
| F | 50.0000 | BF | 55.0000 | 50.6738 | 40.7193 | 34.3292 | 26.5226 | 18.5572 |
| F | 60.0000 | BF | 55.0000 | 50.5860 | 40.7139 | 34.4357 | 26.5070 | 18.4433 |
| F | 70.0000 | BF | 55.0000 | 50.5182 | 40.5073 | 34.3191 | 26.6091 | 18.4834 |
| F | 85.0000 | BF | 55.0000 | 50.4919 | 40.3830 | 34.0878 | 26.4379 | 18.6280 |
| F | 103.0000 | BF | 55.0000 | 50.5542 | 40.5102 | 34.2357 | 26.5207 | 18.5805 |
| F | 36.0000 | DX | .0000 | 1.0365 | .0000 | .0000 | R | 850.00 |
| F | 50.0000 | DX | .0000 | 1.4832 | .0000 | .0000 | R | 850.00 |
| F | 60.0000 | DX | .0000 | 1.8716 | .0000 | .0000 | R | 850.00 |
| F | 70.0000 | CX | .0000 | 2.3111 | .0000 | .0000 | R | 850.00 |
| F | 85.0000 | DX | .0000 | 3.0486 | .0000 | .0000 | R | 850.00 |
| F | 103.0000 | DX | .0000 | 4.0800 | .0000 | .0000 | R | 850.00 |
| F | 36.0000 | DX | .0000 | .8749 | .0000 | .0000 | R | 1000.00 |
| F | 50.0000 | DX | .0000 | 1.2606 | .0000 | .0000 | R | 1000.00 |
| F | 60.0000 | DX | .0000 | 1.6005 | .0000 | .0000 | R | 1000.00 |
| F | 70.0000 | DX | .0000 | 1.9903 | .0000 | .0000 | R | 1000.00 |
| F | 85.0000 | DX | .0000 | 2.6559 | .0000 | .0000 | R | 1000.00 |
| F | 103.0000 | DX | .0000 | 3.6095 | .0000 | .0000 | R | 1000.00 |
| F | 36.0000 | DX | .0000 | .5760 | .0000 | .0000 | R | 1500.00 |
| F | 50.0000 | DX | .0000 | .8413 | .0000 | .0000 | R | 1500.00 |
| F | 60.0000 | DX | .0000 | 1.0818 | .0000 | .0000 | R | 1500.00 |
| F | 70.0000 | DX | .0000 | 1.3834 | .0000 | .0000 | R | 1500.00 |
| F | 85.0000 | DX | .0000 | 1.8895 | .0000 | .0000 | R | 1500.00 |
| F | 103.0000 | DX | .0000 | 2.8358 | .0000 | .0000 | R | 1500.00 |
| F | 36.0000 | DX | .0000 | .4295 | .0000 | .0000 | R | 2000.00 |
| F | 50.0000 | DX | .0000 | .6318 | .0000 | .0000 | R | 2000.00 |
| F | 60.0000 | DX | .0000 | .8179 | .0000 | .0000 | R | 2000.00 |
| F | 70.0000 | DX | .0000 | 1.0410 | .0000 | .0000 | R | 2000.00 |
| F | 85.0000 | DX | .0000 | 1.4475 | .0000 | .0000 | R | 2000.00 |
| F | 103.0000 | DX | .0000 | 2.0903 | .0000 | .0000 | R | 2000.00 |
| F | 36.0000 | DX | .0000 | .2847 | .0000 | .0000 | R | 3000.00 |
| F | 50.0000 | DX | .0000 | .4219 | .0000 | .0000 | R | 3000.00 |
| F | 60.0000 | DX | .0000 | .5502 | .0000 | .0000 | R | 3000.00 |
| F | 70.0000 | DX | .0000 | .7067 | .0000 | .0000 | R | 3000.00 |
| F | 85.0000 | DX | .0000 | 1.0003 | .0000 | .0000 | R | 3000.00 |
| F | 103.0000 | DX | .0000 | 1.4883 | .0000 | .0000 | R | 3000.00 |
| F | 36.0000 | DX | .0000 | .1701 | .0000 | .0000 | R | 5000.00 |
| F | 50.0000 | DX | .0000 | .2536 | .0000 | .0000 | R | 5000.00 |
| F | 60.0000 | DX | .0000 | .3327 | .0000 | .0000 | R | 5000.00 |
| F | 70.0000 | DX | .0000 | .4308 | .0000 | .0000 | R | 5000.00 |
| F | 85.0000 | DX | .0000 | .6198 | .0000 | .0000 | R | 5000.00 |
| F | 103.0000 | DX | .0000 | .9505 | .0000 | .0000 | R | 5000.00 |

As described above, according to the present invention, in a zoom lens system having a plurality of lens units including a focusing lens unit having the zooming and focusing functions, the movement locus of the focusing lens unit is divided into a focus cam and a zoom compensation cam, whereby it can be directly transmitted to a distance ring with the angle of rotation for focusing secured sufficiently greatly and therefore, it becomes possible to enhance the operability and accuracy during focusing.

Further, the movement loci of the non-focusing lens units each are divided into the zoom compensation cam and a zoom cam corresponding to each non-focusing lens unit and resultantly, it becomes possible to use the zoom compensation cam for the focusing lens unit as a zoom compensation cam common to all lens units.

Thus, the focus cam for the focusing lens unit and the zoom cams for the non-focusing lens units have entirely the same function during zooming. Only the focus cam is utilized during focusing and thus, in terms of the structure of hardware, the lens system can be constructed of the same dual structure (a fixed barrel and a zoom barrel) as the heretofore known zoom lens of the front focusing type, and this is simple in structure and therefore, downsizing becomes possible.

Further, where there is present a non-focusing lens unit fixed relative to the image plane during zooming, there can be adopted such structure that a holding barrel for holding the fixed lens unit is directly connected to the fixed barrel 1 in FIG. 13 so as not to be subjected to movement in the direction of the optical axis by the zoom compensation cam $g_H$. Thus, in any case, in terms of the structure of hardware, the lens system can be constructed of the same dual structure (a fixed barrel and a zoom barrel) as the heretofore known zoom lens of the front focusing type.

Furthermore, the present invention does not require any enlarging mechanism in terms of the structure of hardware and can therefore eliminate a back-lash factor attributable to the enlarging mechanism. Still further, the focus cam is determined so that the amount of displacement of the imaging point may be minimum and therefore, even if the amount of axial movement for focusing differs depending on the zooming position, very highly accurate focusing can be realized and excellent manual focusing and quick auto focusing become possible.

As described above, a zoom lens of the internal focusing type or the rear focus type which would heretofore have become complicated in structure can be achieved by very simple structure.

What is claimed is:

1. A zoom lens system having a plurality of lens units including a focusing lens unit movable during zooming and having the zooming and focusing functions, wherein when a predetermined movement locus for zooming is expressed with the angle of rotation of a rotatable lens barrel for prescribing the amount of movement of the lens units in the direction of the optical axis thereof as a variable, the movement locus of said focusing lens unit is formed by the combination of a focus cam and a zoom compensation cam, and the movement locus of the movable non-focusing lens units which are not concerned in focusing is formed by the combination of said zoom compensation cam and a zoom cam corresponding to each non-focusing lens unit.

2. A zoom lens system according to claim 1, wherein the focus cam along which said focusing lens unit is moved for focusing has its shape determined so that the amount of displacement of the position of the imaging point may be sufficiently small in any zooming state and further at any photographing distance, and along therewith, all divided cams are set non-linearly.

3. A zoom lens system according to claim 2, wherein the amount of rotative movement of a distance ring for the focusing of said focusing lens unit is equal to the angle of rotation of the rotatable lens barrel prescribed by said focus cam.

4. A zoom lens system according to claim 1, wherein the amount of rotative movement of a distance ring for the focusing of said focusing lens unit is equal to the angle of rotation of the rotatable lens barrel prescribed by said focus cam.

* * * * *